(12) United States Patent
Zhang et al.

(10) Patent No.: US 12,008,913 B2
(45) Date of Patent: Jun. 11, 2024

(54) SYSTEM, METHOD, AND APPARATUS FOR INTERACTIVE CROCHET KIT AND TUTORIALS THEREOF

(71) Applicant: Low Tech Toy Club, LLC, Cary, NC (US)

(72) Inventors: Xinli Zhang, Cary, NC (US); Justine Tiu, Cary, NC (US)

(73) Assignee: Low Tech Toy Club, LLC, Cary, NC (US)

( * ) Notice: Subject to any disclaimer, the term of this patent is extended or adjusted under 35 U.S.C. 154(b) by 0 days.

(21) Appl. No.: 18/221,691

(22) Filed: Jul. 13, 2023

(65) Prior Publication Data

US 2024/0021098 A1 Jan. 18, 2024

Related U.S. Application Data

(60) Provisional application No. 63/389,192, filed on Jul. 14, 2022.

(51) Int. Cl.
| | | |
|---|---|---|
| *G09B 19/00* | (2006.01) | |
| *D04B 31/00* | (2006.01) | |
| *D04B 33/00* | (2006.01) | |
| *G09B 5/06* | (2006.01) | |
| *G09B 19/20* | (2006.01) | |

(52) U.S. Cl.
CPC ........... *G09B 19/003* (2013.01); *D04B 31/00* (2013.01); *D04B 33/00* (2013.01); *G09B 5/065* (2013.01); *G09B 19/20* (2013.01)

(58) Field of Classification Search
CPC ........ G09B 19/20; D04B 31/00; D04B 31/02; D04B 33/00
See application file for complete search history.

(56) References Cited

U.S. PATENT DOCUMENTS

| | | | | |
|---|---|---|---|---|
| 2008/0003546 | A1* | 1/2008 | Dunbar | G09B 19/20 434/308 |
| 2010/0319407 | A1* | 12/2010 | Neralich | D04B 3/00 66/1 A |
| 2012/0282575 | A1* | 11/2012 | Solomon | D04B 3/00 434/308 |

(Continued)

OTHER PUBLICATIONS

The Woobles; Crochet kits for beginners. Oct. 21, 2020. online. Retrieved from archived.org. Retrieved on Oct. 12, 2023. (Year: 2020).*

(Continued)

*Primary Examiner* — Peter R Egloff
(74) *Attorney, Agent, or Firm* — K&L Gates LLP; Brian J. Novak; Dennis A. Majewski

(57) ABSTRACT

A system, method, and apparatus for an interactive crochet kit and tutorials thereof is disclosed herein. In one example, a kit for making a crochet piece, the kit includes a length of yarn, a first end of the yarn formed into a pre-started piece, the pre-started piece including a plurality of crochet stitches. The kit also includes at least one stitch marker in at least one of the crochet stitches and a knot to prevent unraveling of the pre-started piece. The kit also includes an article including (i) a link to an electronic address with instructions for forming the crochet piece using the length of yarn and the pre-started piece, and (ii) a code for accessing the instructions.

12 Claims, 18 Drawing Sheets

(56) References Cited

U.S. PATENT DOCUMENTS

2015/0059556 A1* 3/2015 Grafman .............. G09B 15/002
  84/485 R
2018/0268730 A1* 9/2018 Chelel ................... G06F 3/0481
2019/0279527 A1* 9/2019 Rohlfs ...................... G06T 7/20

OTHER PUBLICATIONS

Etsy—Beginner Learn to Crochet Kit. online. 2023, with reference to 2020 (Year: 2023).*
Ari Bines—The Woobles is the cutest way to learn to crochet. Mar. 24, 2021. Yahoo! finance; online. Retrieved on Oct. 12, 2023 (Year: 2021).*

* cited by examiner

SYSTEM, METHOD, AND APPARATUS FOR INTERACTIVE CROCHET KIT AND TUTORIALS THEREOF

PRIORITY CLAIM

This application claims priority to and the benefit of provisional U.S. Patent Application No. 63/389,192, filed Jul. 14, 2022, entitled "System, Method, and Apparatus for Interactive Crochet Kit and Tutorials Thereof", the entire contents of which are incorporated herein by reference and relied upon.

BACKGROUND

Beginners to a new craft, such as crochet or knitting, may seek out kits or tutorials to help them get started. However, known crochet and knitting kits have limited utility to these beginners. For example, the instructions included in known kits may include only written instructions or patterns. While crafting beginners can access general tutorials via the internet, which tutorials to search for and follow may be unclear to the beginner. Such general tutorials may require users to piece various tutorials together in order to learn how to make their kit. Further, traditional crochet and knitting kits on the market often expect the user to have a knowledge of crochet and knitting fundamentals, even the kits allegedly designed for beginners.

Additionally, known crochet and knitting kits may not include all of the materials needed to complete a project. For example, in order to crochet a small stuffed piece (i.e., a "plushie"), extensive materials are needed such as yarn, a crochet hook, safety eyes, stuffing, a tapestry needle, and stitch markers. However, a traditional crochet kit may include only yarn and a crochet hook along with written instructions. The time researching additional materials to purchase (e.g., the safety eyes, the stuffing, the stitch markers, etc.) to complete a piece can be overwhelming to a beginner. Moreover, such materials are often only available for purchase in large quantities. When trying out a new hobby, users do not want to invest the money and space into accumulating all these materials.

Another challenge for beginners is working with spun yarn. Most yarn on the market, including yarn included in traditional crochet and knitting kits, is spun, meaning it is made of a plurality of fibers twisted together. The fibers of spun yarn create additional visual lines in a crochet work that can cause confusion to a user, making it difficult for the user to figure out where to put the hook to make the next stitch. Moreover, beginners may accidentally catch the crochet hook between the plurality of fibers of a single piece of spun yarn. Such an issue can prevent a user from crocheting a stitch, stop their crochet progress, and cause frustration.

SUMMARY

An example system, method, and apparatus are disclosed for an interactive crochet kit and tutorials thereof. The example system, method, and apparatus utilize multiple elements to streamline the crochet process for beginners. The crochet kit may include the materials needed to complete a crochet piece including components to improve user experience for a beginner. The crochet kit may be accompanied by tutorials including step-by-step videos and online instructions.

The interactive crochet kit disclosed herein may include a pre-started piece to alleviate user difficulty in beginning a crochet piece. The pre-started piece may include stitch markers in the first few stitches to help the user visualize where to put the hook for the first few stitches. The pre-started piece may also include a fallback knot, which prevents the pre-started piece from unraveling. For example, following a mistake, the user may simply reset back to the starting condition of the pre-started piece by pulling on the working yarn. When such tension is applied to the working yarn, the crochet piece unravels back to the fallback knot, leaving the pre-started piece intact. As such, even if a user makes a mistake, the user will not have to start from scratch if they wish to unravel the yarn including the mistake. The invention of the present disclosure may be configured for complete beginners and is an improvement over the deficiencies of traditional crochet plushies and crochet projects in general.

The interactive crochet kit disclosed herein includes tutorials that correspond directly with the user's crochet kit bundle. In some embodiments, the tutorials include a step-by-step guide including video and/or written instruction to instruct the users in creating a final crocheted piece. These final pieces include, but are not limited to, animal plush toys created by crocheting in the round. The tutorials may include easy to follow videos that allow the user to learn transferable skills (e.g., reading a pattern). This guide may break down each micro-step of the crochet learning process, teaching the user what they need to know, when they need to know it.

Aspects of the subject matter described herein may be useful alone or in combination with one or more other aspect described herein. Without limiting the foregoing description, in a first aspect of the present disclosure, which may be combined with any other aspect listed herein unless specified otherwise, a kit for making a crochet piece includes: a length of yarn, a first end of the yarn formed into a pre-started piece, the pre-started piece including a plurality of crochet stitches, at least one stitch marker in at least one of the crochet stitches, and a knot to prevent unraveling of the pre-started piece; and an article including (i) a link to an electronic address with instructions for forming the crochet piece using the length of yarn and the pre-started piece, and (ii) a code for accessing the instructions.

In accordance with a second aspect of the present disclosure, which may be used in combination with the first aspect, the yarn is a tubular yarn.

In accordance with a third aspect of the present disclosure, which may be used in combination with any one or more of the preceding aspects, the pre-started piece is formed using a magic loop crochet technique.

In accordance with a fourth aspect of the present disclosure, which may be used in combination with any one or more of the preceding aspects, the instructions include a series of videos.

In accordance with a fifth aspect of the present disclosure, which may be used in combination with any one or more of the preceding aspects, the instructions include a series of steps, selection of each step via a user device causing a video to be displayed in the user device for the selected step.

In accordance with a sixth aspect of the present disclosure, which may be used in combination with any one or more of the preceding aspects, each of the videos includes an audio-visual tutorial for completing the selected step of the crochet piece.

In accordance with a seventh aspect of the present disclosure, which may be used in combination with any one or more of the preceding aspects, the series of steps are organized by different features of the crochet piece.

In accordance with a eighth aspect of the present disclosure, which may be used in combination with any one or more of the preceding aspects, each step of the series of steps is linked to a previous step and a subsequent step.

In accordance with a ninth aspect of the present disclosure, which may be used in combination with any one or more of the preceding aspects, each step of the series of steps is linked to a help section with additional information about the step.

In accordance with a tenth aspect of the present disclosure, which may be used in combination with any one or more of the preceding aspects, the kit further includes a hook, a tapestry needle, one or more facial hardware components, and stuffing.

In accordance with a eleventh aspect of the present disclosure, which may be used in combination with any one or more of the preceding aspects, the pre-started piece includes one or more stitch markers.

In accordance with a twelfth aspect of the present disclosure, which may be used in combination with any one or more of the preceding aspects, the instructions include a first option for a left-handed user and a second option for a right-handed user, selection of the first option via a user device causing first instructions for a left-handed user to be displayed via the user device, and selection of the second option via the user device causing second instructions for a right-handed user to be displayed via the user device.

In accordance with a thirteenth aspect of the present disclosure, a method performed by a server includes: presenting a series of steps for making a crochet piece to a plurality of users, collecting first data corresponding to user access of one of the steps of the instructions, collecting second data corresponding to user interaction with the step, comparing the first data and the second data, and updating the step based on the comparison.

In accordance with a fourteenth aspect of the present disclosure, which may be combined with any other aspect listed herein unless otherwise specified, the user interaction includes a user request for additional help with the step.

In accordance with a fifteenth aspect of the present disclosure, which may be combined with any other aspect listed herein unless otherwise specified, the updating includes at least one of modifying a video displayed for the step or modifying text associated with the step.

In accordance with a sixteenth aspect of the present disclosure, a kit for making a crochet piece includes a length of yarn, and an article including (i) a link to an electronic address with instructions for forming the crochet piece using the length of yarn, and (ii) a code for accessing the instructions.

In accordance with a seventeenth aspect of the present disclosure, which may be combined with any other aspect listed herein unless otherwise specified, the yarn is a tubular yarn.

In accordance with a eighteenth aspect of the present disclosure, which may be combined with any other aspect listed herein unless otherwise specified, the instructions include a series of videos.

In accordance with a nineteenth aspect of the present disclosure, a kit for making a crochet piece, the kit includes a length of yarn, and an article including a link to an electronic address with instructions for forming the crochet piece using the length of yarn.

In accordance with a twentieth aspect of the present disclosure, which may be combined with any other aspect listed herein unless otherwise specified, the yarn is a tubular yarn.

In accordance with a twenty-first aspect of the present disclosure, any of the structure and functionality illustrated and described in connection with FIGS. 1 to 20 may be used in combination with any of the structure and functionality illustrated and described in connection with any of the other of FIGS. 1 to 20 and with any one or more of the preceding aspects.

In light of the present disclosure and the above aspects, it is therefore an advantage of the present disclosure to provide a crochet kit that includes components and instructions for assisting a user with limited crochet skills in making a crochet piece.

It is another advantage of the present disclosure to provide tubular yarn to make forming of the crochet piece easier for a beginner.

It is a further advantage of the present disclosure to provide a pre-started piece to reduce difficulty in beginning a crochet piece and provide a fallback position for a user who makes a mistake in the crochet piece.

It is yet a further advantage of the present disclosure to provide step-by-step instructions to guide a user through each step of the process for creating a final crocheted piece.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

The present disclosure relates in general to a system, method, and apparatus for an interactive crochet kit and tutorials thereof. The system, method, and apparatus include materials and instructions for a user, in particular a beginner user with limited knowledge of crochet technique, to complete a crochet piece. The provided materials are designed so as to improve ease of use for a beginner user compared to traditional crochet kits. The corresponding tutorials for completing the crochet piece are further configured to improve ease of use for a beginner user by including step-by-step instructions with interactive help content.

Figure 1:
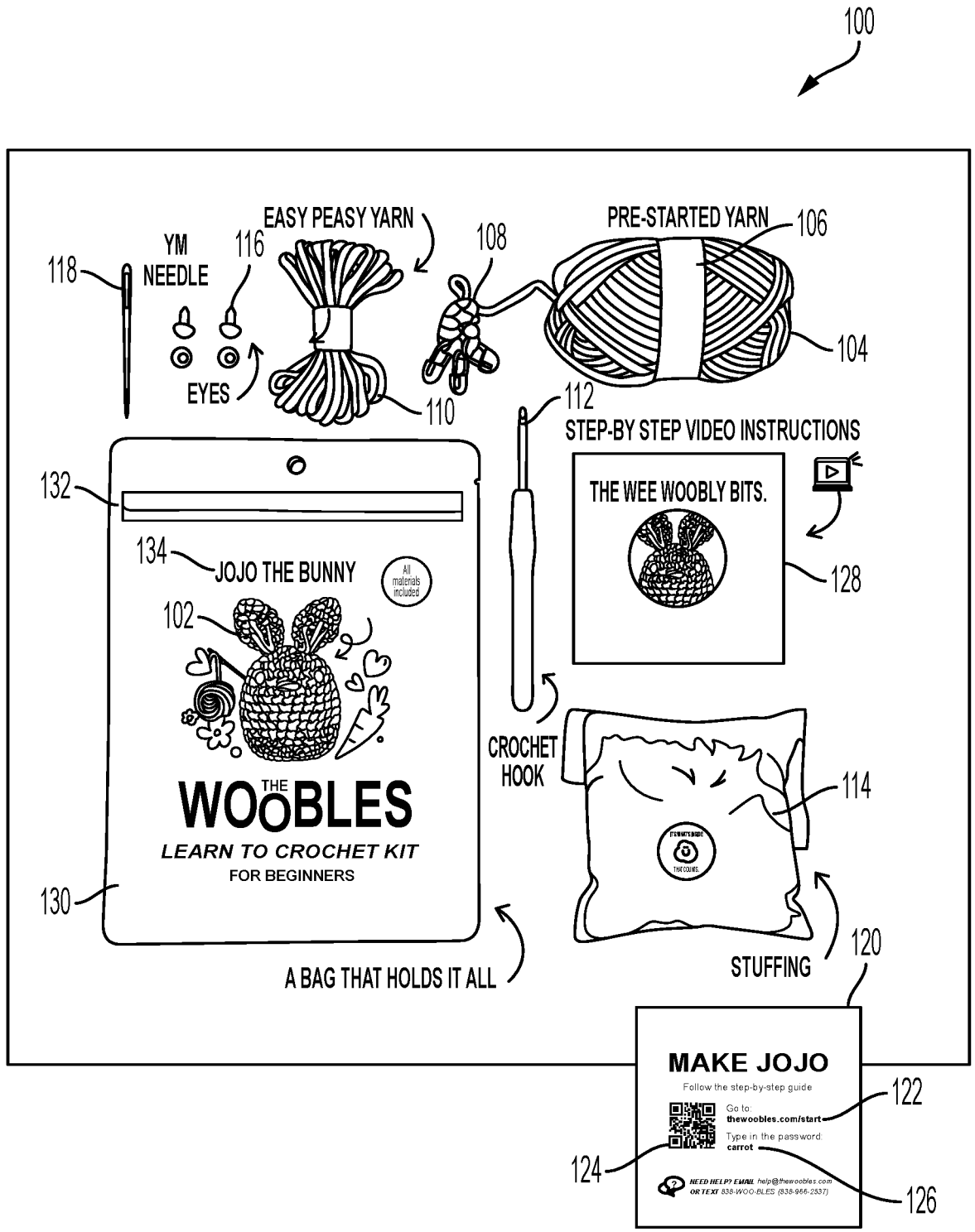
FIG. 1 is a diagram of an interactive crochet kit, according to an example embodiment of the present disclosure.

FIG. 1 is a diagram of an interactive crochet kit 100, according to an example embodiment of the present disclosure. The crochet kit 100 includes materials needed to complete a crochet piece 102 and instructions for accessing tutorials for completing the crochet piece 102. The example crochet kit 100 may be configured for a beginner crochet user (e.g., a user with no previous crochet experience or knowledge).

The example crochet kit 100 of FIG. 1 includes yarn 104. In some examples, the yarn 104 is a tubular yarn. The yarn 104 may be made from cotton, wool, acrylic, nylon, or any other suitable material. In some examples, the yarn 104 is made from a combination of cotton, wool, acrylic, nylon, or any other suitable material. An amount of the yarn 104 may be included in the example crochet kit 100 sufficient for the user to create the crochet piece 102. In some examples, the amount of the yarn 104 may be sufficient to create more than one of the crochet piece 102. The example yarn 104 of the crochet kit 100 is wound into a skein. In other examples, the yarn 104 may be wound into a ball, a hank, or any other form to reduce tangling of the yarn 104.

The example yarn 104 includes a yarn label 106. The example yarn label 106 circumscribes the skein of the yarn 104 to help reduce unraveling of the yarn 104 from the skein. The example yarn label 106 is made from a paper material and includes printed text on an exterior surface. The example yarn label 106 includes an adhesive surface at one end of the yarn label 106 which adheres to a second end of the yarn label 106 in order to maintain a position of the yarn label 106 around the yarn 104.

A first end of the example yarn 104 is formed into a pre-started piece 108. The example pre-started piece 108 allows a user to begin to crochet the crochet piece 102 without performing initial steps of a crochet project. Details corresponding to the pre-started piece 108 are discussed below with respect to FIGS. 2 and 3.

The example crochet kit 100 includes a second yarn 110. The example second yarn 110 is formed from a color different than a color of the first yarn 104. The example second yarn 110 may be used in combination with the first yarn 104 to form the crochet piece 102. For example, the crochet piece 102 may include first portions formed from a first color and second portions formed from a second color. As such, the user can form the crochet piece 102 using the first yarn 104 having the first color to form the first portions and using the second yarn 110 having the second color to form the second portions. In some examples, the crochet piece 102 includes portions having more than two (e.g., three, four, etc.) colors. In these examples, the crochet kit 100 may include additional lengths of yarn formed from the additional colors.

The example crochet kit 100 includes a crochet hook 112. The example crochet hook 112 includes a handle portion and a hook portion. The hook portion of the crochet hook 112 includes a metal hook in a suitable size (e.g., 4 mm) for crocheting the crochet piece 102 from the yarn 104. The example crochet hook 112 is an ergonomic hook having the handle portion formed from a plastic material in an ergonomic shape. In some examples, the crochet hook 112 may be formed from a single material (e.g., metal, plastic, etc.). In some examples, the crochet hook 112 includes a design (e.g., a logo, a decorative graphic, etc.) and/or information (e.g., a size of the crochet hook) printed on an outer surface of the crochet hook 112. In some examples, the design and/or information may be formed via raised or recessed surfaces (e.g., embossing) in the outer surface of the crochet hook 112.

The example crochet kit 100 includes stuffing 114. The example stuffing 114 may be used to fill a void formed by crochet stitches in order to form a three-dimensional shape of the crochet piece 102. The example crochet kit 100 may include an amount of the stuffing 114 sufficient to form least the crochet piece 102. The example stuffing 114 may be formed from polyester fibers, foam, cotton, recycled materials, or any other material suitable for filling the crochet piece 102. The example stuffing 114 is provided in a clear plastic bag sealed with a self-adhesive sticker.

The example crochet kit 100 includes facial hardware components. Specifically, the example crochet kit 100 includes two pairs of eyes 116. In other examples, the crochet kit 100 may include facial hardware components instead of or in addition to the eyes 116 such as nose hardware, horn hardware, whisker hardware, etc. The eyes 116 may be used to form two eyes of the crochet piece 102. The example eyes 116 of the crochet kit 100 include two pairs of plastic eyes, each pair including a front piece and a back piece. The front piece of the example eyes 116 includes a round eye portion having a diameter (e.g., 10 mm) suitable for a size of the crochet piece 102. In other examples, the eyes 116 may have a noncircular shape (e.g., an oval, a pointed oval, a polygon, a shape with one or more cutouts, a shape with one or more protrusions, a shape with an irregular border, etc.) corresponding to a design of the crochet piece 102. In some examples, the crochet piece 102 includes fewer (e.g., one or zero) or more (e.g., three, four, etc.) eyes. In these examples, the crochet kit 100 may include a number of eyes at least corresponding to the number of eyes of the crochet piece 102.

The example crochet kit 100 includes a tapestry needle 118. The example tapestry needle 118 may be used to form one or more portions of the crochet piece 102. For example, the tapestry needle 118 may be used to close an opening of the crochet piece 102 after stuffing it. The example tapestry needle 118 is a blunt metal tapestry needle that is 70 mm in length, but may be formed of any suitable material (e.g., plastic, wood, etc.) and have an suitable length.

The example crochet kit 100 includes an instruction card 120. The example instruction card 120 includes a linked electronic address 122. The linked electronic address 122 includes a tutorial (e.g., step-by-step instructions) for forming the crochet piece 102 using the yarn 104 and the other materials (e.g., the hook 112, the second yarn 110, the eyes 116, the tapestry needle 118, etc.) included in the crochet kit. In some examples, the tutorial (e.g., the instructions) includes a series of videos including audio-visual tutorials for completing the crochet piece 102. In some examples, the tutorial included in the linked electronic address 122 is password protected. For example, a user may only be able to access the tutorial after entering in a code (e.g., a password). The example instruction card 120 also includes a Quick Response (QR) code 124 corresponding to the linked electronic address 122. The example instruction card includes a code 126. The example code 126 may be used on the linked electronic address 122 in order to access the tutorial for completing the crochet piece 102.

The example crochet kit 100 includes a packet 128. The example packet 128 may include the eyes 116, the tapestry needle 118, and the instruction card 120. In some examples the packet 128 includes a third piece of yarn for embroidering eyes on the crochet piece as an alternative to using the eyes 116.

The example crochet kit 100 includes a pouch 130. The example pouch 130 may be used to contain the contents of the crochet kit 100 (e.g., the yarn 104, the second yarn 110, the crochet hook 112, the stuffing 114, and the packet 128 including the eyes 116, the tapestry needle 118, and the instruction card 120). The example pouch 130 includes interlocking plastic strips 132 such that the pouch 130 is resealable packaging for the crochet kit 100. In other examples, the pouch 130 may include other methods for resealing (e.g., hook and loop fasteners, a zip feature, etc.). The example pouch 130 includes a print of an image of the example crochet piece 102 that can be formed using the materials included in the crochet kit 100 and a title 134 of the crochet piece 102.

Figure 2:
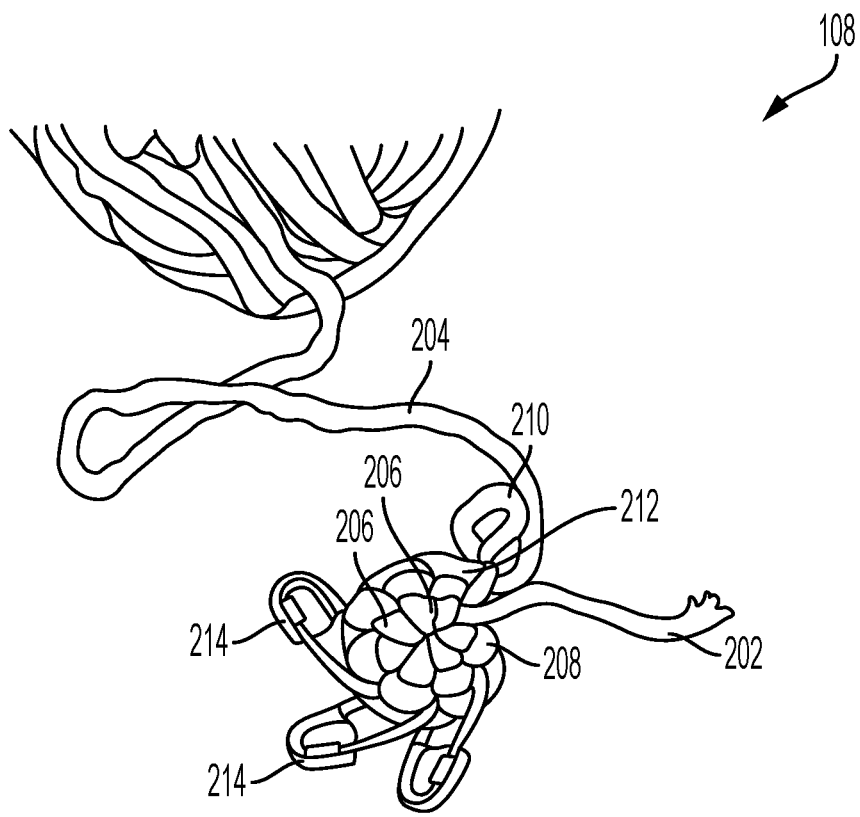
FIG. 2 is a diagram that shows one example of a pre-started piece of the interactive crochet kit of FIG. 1, according to an example embodiment of the present disclosure.

FIG. 2 is a diagram that shows one example of the pre-started piece 108 of FIG. 1, according to an example embodiment of the present disclosure. The example pre-started piece 108 is formed from a first end of the yarn 104 of FIG. 1. As such, a tail end 202 of the pre-started piece 108 extends from the pre-started piece 108 in a direction away from the yarn 104. Additionally, working yarn 204 extends from the pre-started piece 108 toward and connected to the yarn 104. The example tail end 202 may be short (e.g., 5 cm or less) to reduce confusion between the tail end 202 and the working yarn 204.

The example pre-started piece 108 includes a plurality of crochet stitches 206 formed into a loop 208. For example, the loop 208 may be formed using a technique referred to as a magic loop technique. The crochet stitches 206 may then be formed such that the base of each of the crochet stitches 206 is attached to the loop 208 of the magic loop. In the example pre-started piece 108, the crochet stitches 206 are single crochet stitches. In other examples, the crochet stitches 206 may be double crochet stitches, treble crochet stitches, or any other suitable crochet stitch. In the example pre-started piece 108, there are six crochet stitches 206. In other examples, the pre-started piece 108 may include more or less than six crochet stitches 206. An amount and type of the crochet stitches 206 in the loop 208 may correspond to a number of stitches prescribed in a first round of a pattern for completing the crochet piece 102.

The example pre-started piece 108 includes a working loop 210. The example working loop 210 is connected to a last one of the crochet stitches 206. The example working loop 210 is also connected to the working yarn 204. The example working loop 210 provides a location for a user to place a crochet hook when beginning to crochet the crochet piece 102. An inner diameter of the working loop 210 is approximately the diameter of a hook (e.g., the crochet hook 112 of FIG. 1) used to make the crochet piece 102.

The example pre-started piece 108 includes a fallback knot 212. The example fallback knot 212 prevents unraveling of the pre-started piece 108. For example, if the working yarn 204 is pulled, the fallback knot 212 prevents the crochet stitches 206 from unraveling such that the working loop 210 is maintained even under such tension. In the absence of the fallback knot 212, tension on the working yarn 204 may cause the working loop 210 to be eliminated and the crochet stitches 206 to unravel. As such, the fallback knot 212 maintains the form of the pre-started piece 108.

The example fallback knot 212 further provides a stopping point for intentional unraveling of the working yarn 204. For example, if a user makes a mistake when crocheting the crochet piece 102, the user can apply tension to the working yarn 204 to intentionally unravel user-formed crochet stitches. The fallback knot 212 ensures that the piece will unravel until the original pre-started piece 108 including the working loop 210 is revealed. The user may then re-start their crochet process starting from the pre-started piece 108.

The example pre-started piece 108 includes a plurality of stitch markers 214. The example stitch markers 214 may indicate to a user one or more locations for placing a crochet hook when crocheting a second round of the crochet piece 102. For example, a user may insert a crochet hook into the working loop 210 to begin crocheting and then use the stitch markers 214 as a guide for where to place the hook to form a subsequent crochet stitch. In some examples, a first one of the stitch markers 214 has a color that is different than the one or more other stitch markers 214. In these examples, the color of the first one of the stitch markers 214 may indicate to a user that the first one of the stitch markers 214 designates a location of a first crochet stitch 206 of the loop 208. In some examples, second, third, or additional stitch markers 214 may be color-coded in a similar manner to designate subsequent crochet stitches 206 in the loop 208. In some embodiments the crochet kit 100 of FIG. 1 may omit the pre-started piece 108 and/or the stitch markers 214.

Figure 3:
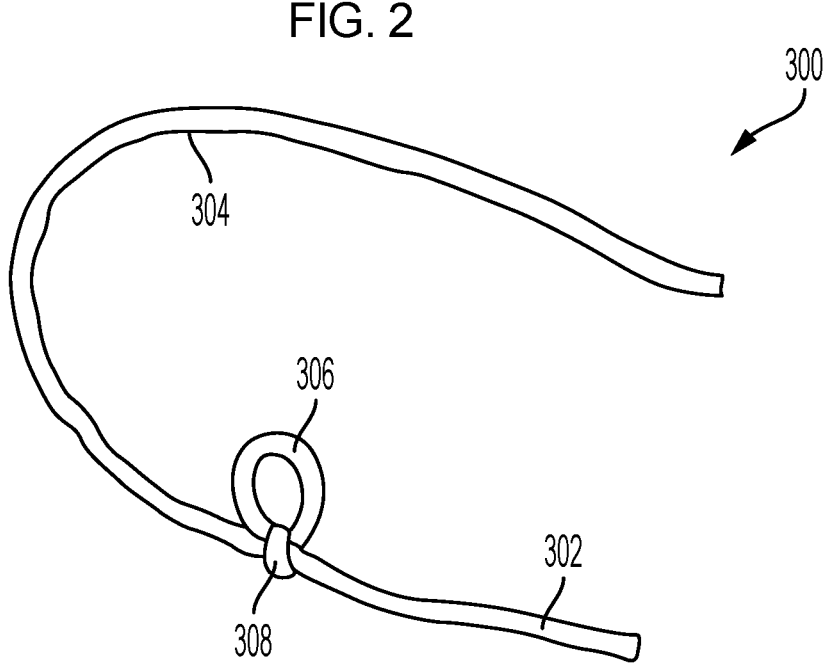
FIG. 3 is a diagram that shows another example of a pre-started piece, according to an example embodiment of the present disclosure.

FIG. 3 is a diagram that shows a second example pre-started piece 300, according to an example embodiment of the present disclosure. The second example pre-started piece 300 is formed from the first end of the yarn 104 of FIG. 1. As such, the tail end 302 of the pre-started piece 300 extends from the pre-started piece 300 in a direction away from the yarn 104. Additionally, working yarn 304 extends from the pre-started piece 300 toward and connected to the yarn 104. The second example pre-started piece 300 includes a working loop 306. The example working loop 306 is connected to the tail end 302 and the working yarn 304. The example working loop 306 provides a location for a user to place a crochet hook when beginning to crochet the crochet piece 102. An inner diameter of the working loop 306 is approximately the diameter of a hook (e.g., the crochet hook 112 of FIG. 1) used to make the crochet piece 102.

The example pre-started piece 300 includes a fallback knot 308. The example fallback knot 308 prevents unraveling of the working loop 306 of the pre-started piece 300. For example, if the working yarn 304 is pulled, the working loop 306 is maintained even under such tension. In the absence of the fallback knot 308, tension on the working yarn 304 may cause the working loop 306 to be eliminated. As such, the fallback knot 308 maintains the form of the pre-started piece 300. In some embodiments the crochet kit 100 of FIG. 1 may omit the pre-started piece 300.

Figure 4:
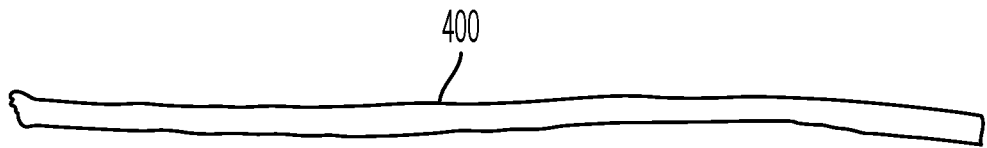
FIG. 4 is a diagram of tubular yarn, according to an example embodiment of the present disclosure.

FIG. 4 is a diagram of tubular yarn 400, according to an example embodiment of the present disclosure. The example tubular yarn 400 may be representative of the tubular yarn of the yarn 104 or the second yarn 110 of the crochet kit 100 of FIG. 1. As discussed above, the tubular yarn 400 may be made from cotton, wool, acrylic, nylon, any other suitable material, or any combination thereof. The example tubular yarn 400 may have qualities that assist with easy of crocheting. In other words, the example tubular yarn 400 may make crocheting easier for beginner users. For example, the tubular yarn 400 may be a soft, springy drawstring and not a spun yarn made from a plurality of fibers twisted together. As such, a stitch definition may be increased with the tubular yarn 400 compared to a stitch definition of stitches crocheted from traditional yarn. Further, because the tubular yarn 400 does not include a plurality of fibers twisted together, a user is unable to split the tubular yarn 400 with the crochet hook. Similarly, a crochet hook is less likely to get snagged on the tubular yarn 400 than on traditional yarn made with a plurality of twisted fibers. Moreover, a smooth surface of the tubular yarn 400 may reduce friction, promote durability of the tubular yarn 400, and encourage faster crocheting.

Figure 5:
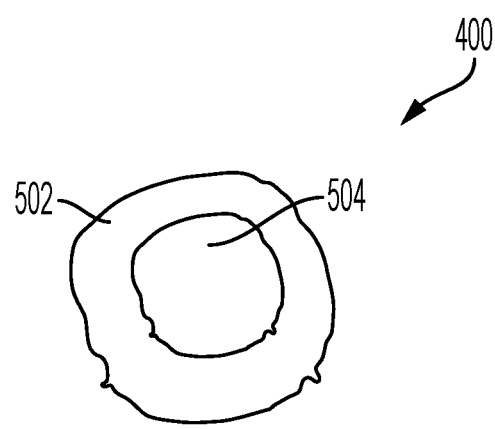
FIG. 5 is a diagram of a cross sectional view of the tubular yarn of FIG. 4, according to an example embodiment of the present disclosure.

FIG. 5 is a diagram of a cross sectional view of the tubular yarn 400 of FIG. 4, according to an example embodiment of the present disclosure. The example tubular yarn 400 includes an external casing 502 and an internal material 504. The example external casing 502 has a tubular shape with a hollow interior. The example external casing 502 forms a smooth outer surface of the tubular yarn 400. The example internal material 504 fills the hollow interior of the external casing 502. The external casing 502 may be made from a material (e.g., cotton, nylon, wool, etc.) or a combination of materials. The example internal material 504 may be made from a material (e.g., cotton, nylon, wool, etc.) or a combination of materials. In some examples, the external casing 502 and the internal material 504 are made from the same material. In some examples, the external casing 502 and the internal material 504 are made from different materials. In some examples, the internal material 504 is omitted from at least a portion of the tubular yarn 400.

Figure 6:
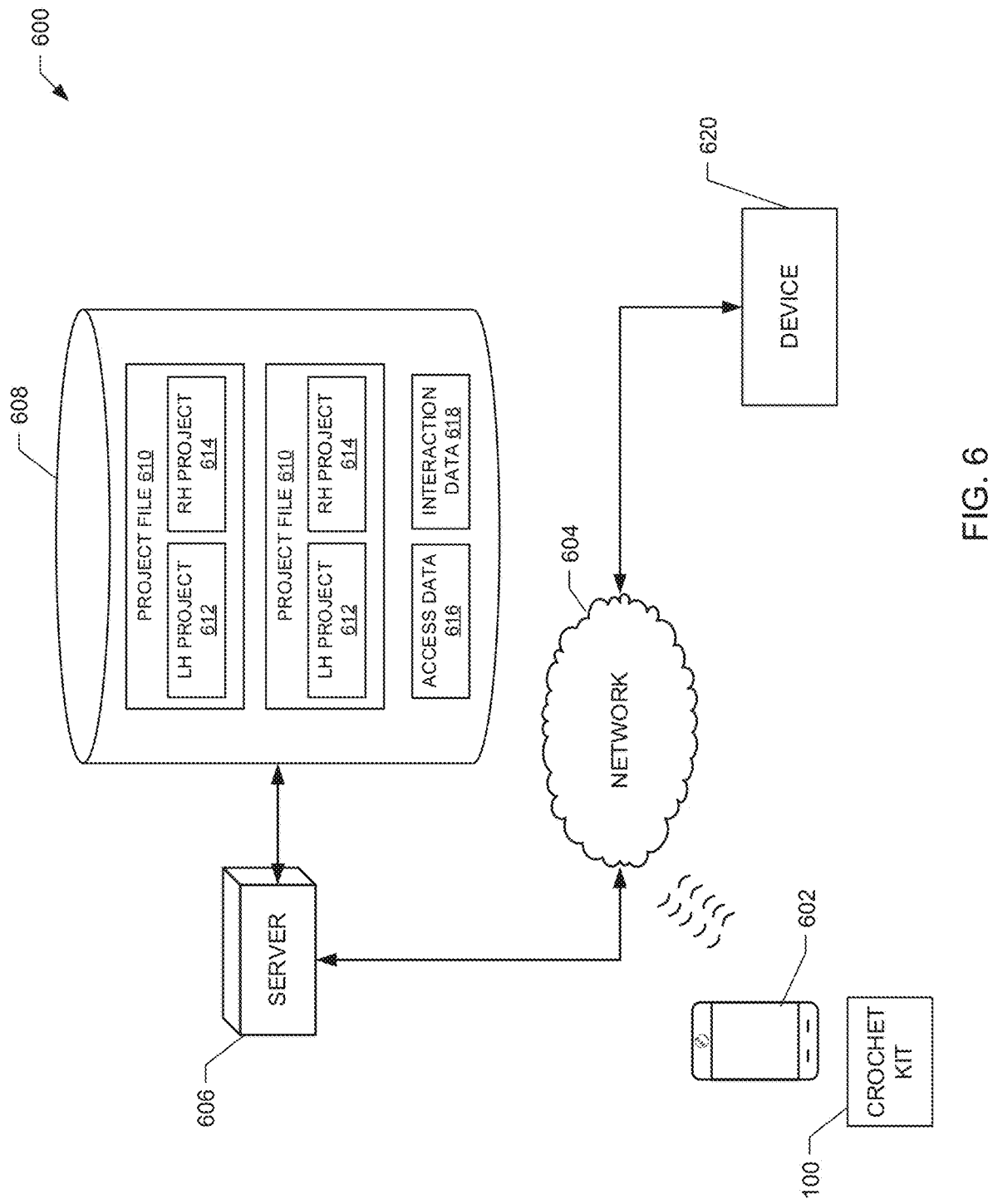
FIG. 6 is a diagram of an example system for accessing a tutorial for completing the crochet piece, according to an example embodiment of the present disclosure.

FIG. 6 is a diagram of an example system 600 for accessing the tutorial for completing the crochet piece, according to an example embodiment of the present disclosure. The example system 600 includes a user device 602 communicatively coupled to a network 604. While the user device 602 is shown as a smartphone, in other examples the user device 602 can include a laptop, a tablet computer, a desktop computer, a workstation, smart-eyewear, or an augmented reality headset.

The example user device 602 accesses a tutorial (e.g., step-by-step instructions) for the crochet kit 100 via the network 604 and a server 606. While FIG. 6 shows a wireless link, in other embodiments, the user device 602 is connected to the network 604 via a wired link, such as an Ethernet connection. The example user device 602 accesses the server 606 using a web browser or an application (e.g., an app, a program, etc.). Examples disclosed herein illustrate use of a web browser by the user device 602 to access the tutorial and/or help content associated with the tutorial, but it should be appreciated that the tutorial and/or the help content may be provided in an application of the user device 602. In an example where the user device 602 includes an augmented reality headset, the tutorial and/or the help content may include content that instruct a user how to move their hands to form crochet stitches or other techniques used to make a finished crochet piece.

The example server 606 is coupled to a project database 608. The example project database 608 includes a plurality of project files 610. Each one of the example project files 610 includes a left-handed (LH) project 612 and a right-handed (RH) project 614. Each one of the LH projects 612 and the RH projects 614 includes a plurality of steps to assist a user in completing a crochet project. The steps included in the LH projects 612 include instructions for a left-handed user whereas the steps included in the RH projects 614 include instructions for a right-handed user.

A user of the example user device 602 may access one of the project files 610 via the server 606. When the user of the user device 60 accesses the project file 610, the user may be prompted to select the LH project 612 or the RH project 614. When the user of the user device 602 selects the LH project 612, instructions for a left-handed user to complete a crochet piece associated with the project file 610 for a left-handed user may be displayed on the user device 602. When the user of the user device 602 selects the RH project 614, instructions for a right-handed user to complete the crochet piece associated with the project file 610 may be displayed on the user device 602.

The example project database 608 further includes access data 616 and interaction data 618. The example access data 616 includes metrics corresponding to user access of the steps of the project files 610. The example interaction data 618 includes metrics corresponding to user interaction with the steps of the project files 610.

The example system 600 includes a device 620 communicatively coupled to the server 606 via the network 604. While FIG. 6 shows a wired connected, in other embodiments, the device 620 is connected to the network 604 via a wireless link. The example device 620 may be used to generate the project files 610. For example, a user of the device 620 can create files corresponding to the project files 610. In some examples, the user of the device 620 creates files corresponding to a new project file 610. In other examples, the user of the device 620 modifies an existing project file 610. In some examples, the modification of a project file 610 can be based on the access data 616 and/or the interaction data 618, as discussed below in conjunction with FIG. 13. In some examples, the modification of a project file 610 includes at least one of modifying video(s) and/or text displayed to a user.

The user of the device 620 can upload the project files 610 to the project database 608 via the network 604 and the server 606. Once the project files 610 are uploaded to the project database 608, a user of the user device 602 can access the project files 610. In some examples, a new project file 610 is uploaded to the project database 608 such that a number of project files 610 included in the project database 608 is increased. In other examples, an updated project file 610 is uploaded to the project database 608 such that the number of project files 610 included in the project database 608 remains the same, but one or more of the project files 610 is modified.

Figure 7:
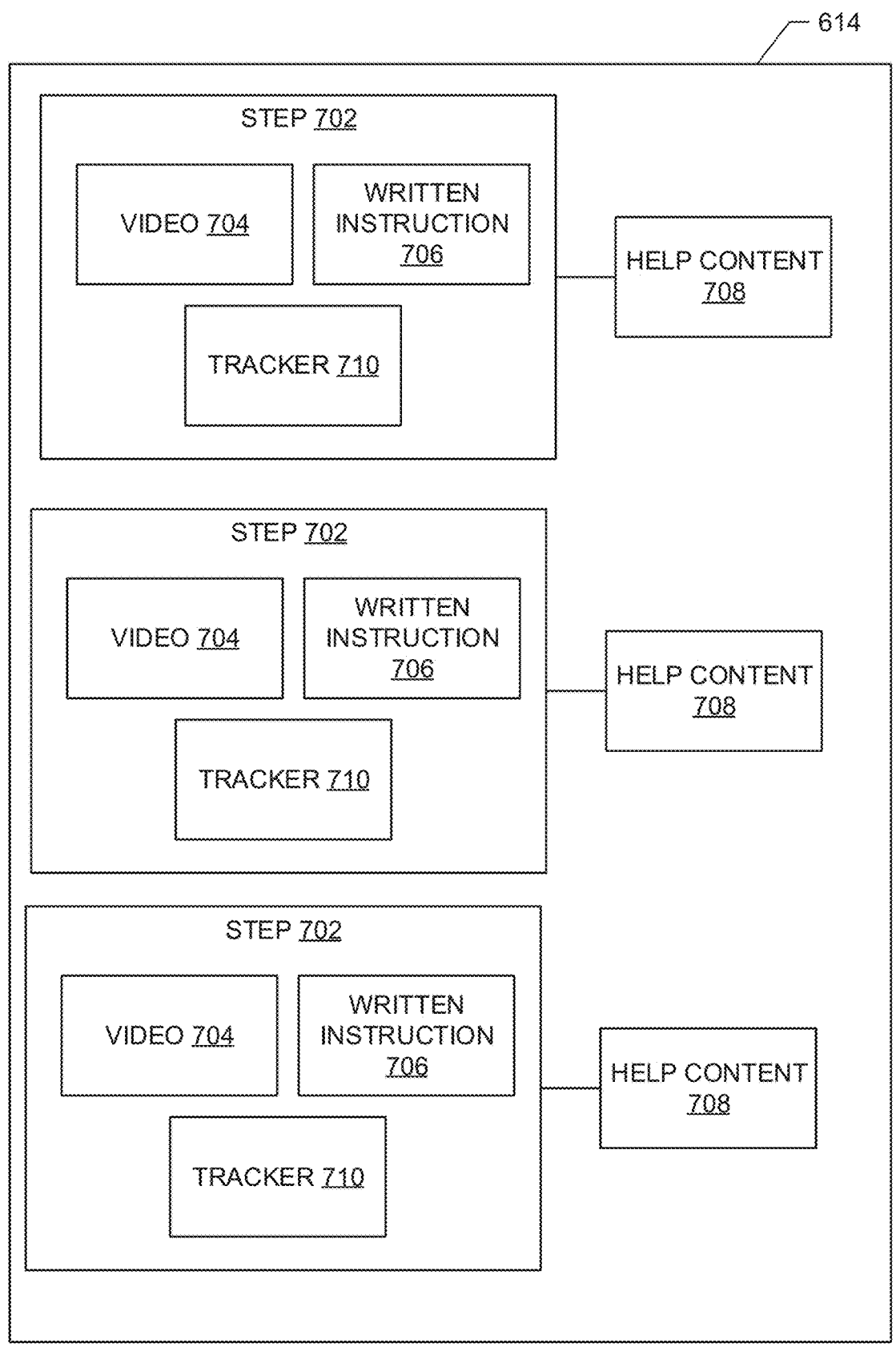
FIG. 7 is a diagram of an example project file, according to an example embodiment of the present disclosure.

FIG. 7 is a diagram of an example RH project 614, according to an example embodiment of the present disclosure. The example RH project 614 includes a plurality of steps 702. In some embodiments, the example step 702 corresponds to a tutorial for a basic crochet technique (e.g., how to hold a crochet hook, how to hold yarn, making a single crochet stitch, making an increase stitch, etc.). In other embodiments, the example step 702 corresponds to a tutorial for completing a portion of the crochet piece 102 of the example crochet kit 100 of FIG. 1 (e.g., how to complete a provided step in the pattern for the crochet piece, how to add the stuffing, etc.). The example RH project 614 includes three of the steps 702. In some examples, a project includes less steps (e.g., two steps) or more steps (e.g., 10 steps, 15 steps, 20 steps, etc.).

As such, the example steps 702 of the RH project 614 can form a step-by-step guide for a user to complete the crochet piece 102 of the example crochet kit 100 (FIG. 1). For example, each example step 702 includes sufficient instruction such that a user with no prior knowledge of crochet techniques can complete the step 702 with only the instruction of the step 702 and any preceding steps. After a user has completed each of the example steps 702 of the example RH project 614 corresponding to the crochet kit 100, a user can create the final crochet piece 102 corresponding to the crochet kit 100.

The example RH project 614 may be configured such that there is not a step 702 for every discrete step of forming the crochet piece 102. As such, the example RH project 614 is configured to ensure that the user is learning and retaining the information on how to crochet. For example, a user may retain information on how to crochet better when instructions become gradually limited to encourage the user to learn the process and gain confidence.

Each example step 702 includes a video 704 and written instructions 706. In some examples, the step 702 can include more than one video 704 and/or more than one portion of written instructions 706. In some examples, a step 702 includes only the video 704 or the written instructions 706. The one or more videos 704 and/or the one or more written instructions 706 of the example step 702 form the tutorial for completing the step 702.

The example videos 704 may be generated and displayed from the user's point of view. In one embodiment, the videos 704 include human actors. In an alternative embodiment, the videos 704 may feature animated characters and/or other animated media. The example written instructions 706 may include a short message to orient the user to the step 702 and/or the video 704, a textual explanation of the video 704, textual explanation to complete the step 702 for a portion of the step 702 not illustrated in the video, or any other instruction for assisting a user in completing the step 702. In some examples, the written instructions 706 are color-coded to assist a user in retaining the educational material of the step 702.

Each example step 702 of the RH project 714 of FIG. 7 is linked to help content 708. In some examples, the step 702 may be linked to more than one help content 708. In other examples, the step 702 may not be linked to the help content 708. The example help content 708 for the step 702 may be linked via the written instructions 706. For example, the written instructions 706 may include a hyperlink to the help content 708.

The example help content 708 may include additional video and/or written instruction to assist a user in completing the step 702. In some examples, the help content 708 is accessed through a domain that is different than the domain including the content of the step 702. In other examples, the help content 708 is accessed through the same domain as the domain including the content of the step 702. An example of the help content 708 is discussed below with respect to FIG. 11.

Each example step 702 of the RH project of FIG. 7 includes a tracker 710. The example tracker 710 collects access data (e.g., the access data 616 of FIG. 6) and interaction data (e.g., the interaction data 618 of FIG. 6) corresponding to the step 702. The access data collected by the tracker 710 of step 702 may include information corresponding to users that have accessed the step 702 (e.g., a total number of users, a number of unique users, demographics corresponding to the users, etc.). The interaction data collected by the tracker 710 of step 702 may include information corresponding to interaction of the users who have accessed the step 702 with the step 702 (e.g., a number of users who have played the video 704, a number of users who have clicked the hyperlink to the help content 708, etc.). In some examples, the step 702 may include more than one tracker 710. In other examples, the step 702 may not include a tracker 710.

Figure 8:
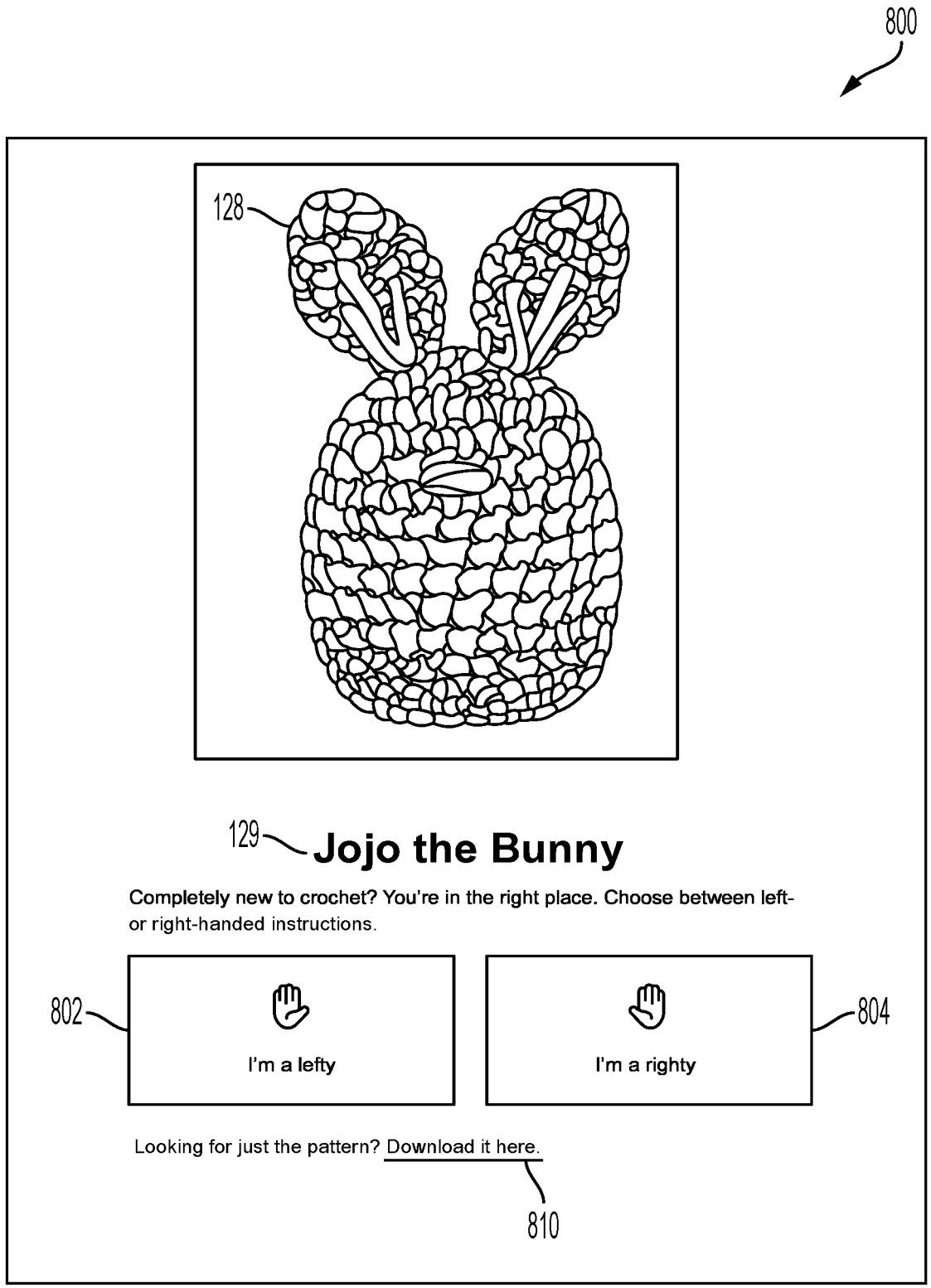
FIG. 8 is a diagram of an example selection step of the tutorial including an option to select left-handed instructions or right-handed instructions, according to an example embodiment of the present disclosure.

FIG. 8 is a diagram of an example selection step 800 of the tutorial including an option to select a left-handed tutorial or a right-handed tutorial, according to an example embodiment of the present disclosure. For example, a user of the user device 602 of FIG. 6 may access the selection step 800 via the server 606 of FIG. 6. The example of FIG. 8 illustrates use of a web browser by the user device 602 to access the selection step 800, but it should be appreciated that the selection step 800 may be provided in an application of the user device 602.

The example selection step 800 allows a user to select left-handed instructions or right-handed instructions. For example, a user may select a first button 802 corresponding to left-handed instructions. Selection of the first button 802 causes a next step to load wherein the subsequent steps include instructions for a left-handed user. In other words, selection of the first button 802 causes a left-handed project (e.g., the LH project 612 of FIG. 6) to be presented to the user. In another example, a user may select a second button 804 corresponding to right-handed instructions. Selection of the second button 804 causes a next step to load wherein the subsequent steps include instructions for a right-handed user. In other words, selection of the second button 804 causes a left-handed project (e.g., the RH project 614 of FIG. 6) to be presented to the user.

The example selection step 800 includes an image of the completed crochet piece 102 corresponding to the tutorial including the selection step 800. The example selection step further includes a title 129 of the completed crochet piece 102 corresponding to the tutorial including the selection step 800.

The example selection step 800 includes a hyperlink 810 for downloading a crochet pattern. For example, a user can click the hyperlink 810 in order to access a crochet pattern corresponding to the crochet piece 102. The crochet pattern may include one or more pages, the one or more pages including text and images instructing a user on how to create the crochet piece 102. In some examples, the crochet pattern is in the form of a Portable Document Format (PDF).

Figure 9:
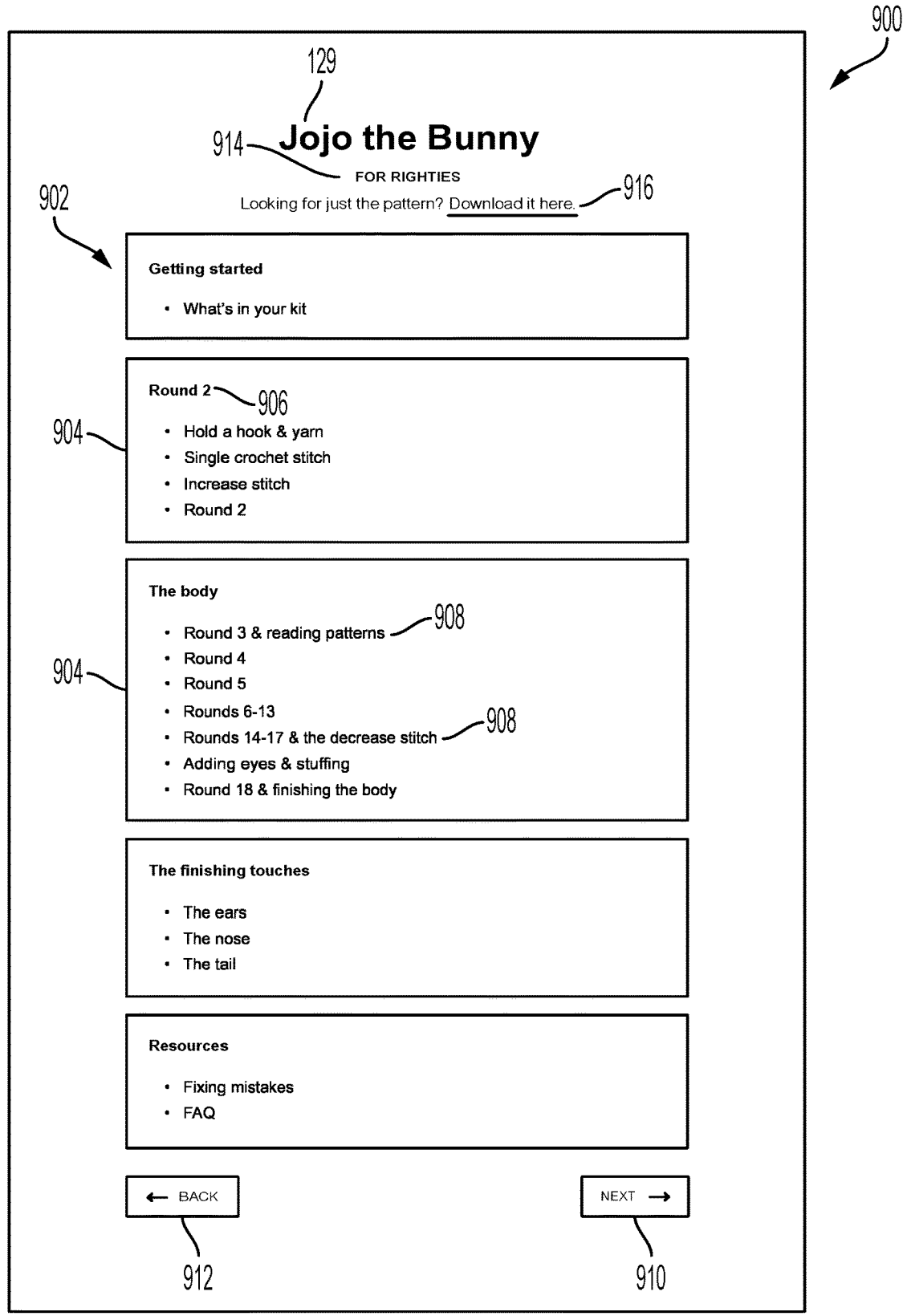
FIG. 9 is a diagram of an example introductory page of the tutorial which lists additional steps for completing the crochet piece, according to an example embodiment of the present disclosure.

FIG. 9 is a diagram of an example introductory page 900 of the tutorial including an outline 902 of the tutorial for completing the crochet piece (e.g., the crochet piece 102 of FIG. 1), according to an example embodiment of the present disclosure. For example, a user of the user device 602 of FIG. 6 may access the introductory page 900 via the server 606 of FIG. 6. The example of FIG. 9 illustrates use of a web browser by the user device 602 to access the introductory page 900, but it should be appreciated that the introductory page 900 may be provided in an application of the user device 602.

The example tutorial outline 902 includes a plurality of sections 904. Each one of the sections 904 may correspond to a different feature of the crochet piece 102. Each of the sections 904 includes a title 906 and one or more steps 908. Each one of the steps 908 corresponds to a basic crochet technique and/or a specific step for completing the crochet piece 102. As such, the tutorial includes a series of steps 908 organized by different features of the crochet piece 102.

Each of the example steps 908 displayed on the example introductory page 900 includes a hyperlink to a page corresponding to the example step 908. For example, from the introductory page 900, a user can select any one of the example steps 908 in order to view the selected step 908. Each of the example steps 908 may include a video. Therefore, user selection of one of the steps 908 via a user device (e.g., the user device 602 of FIG. 6) may cause a video corresponding to the step 908 to be displayed on the user device.

Additionally or alternatively, a user can select a first navigation button 910 to view a subsequent step 908 in the tutorial. For example, the user can select the first navigation button 910 included in the introductory page 900 and each subsequent step 908 in order to view each step 908 of the tutorial sequentially. The example introductory page 900 further includes a second navigation button 912. The second navigation button 912 of the example introductory page 900 causes the selection step 800 to be displayed.

The example introductory page 900 may be presented to a user after the user selects the second button 804 of the selection step 800 of FIG. 8. As such, the example introductory page 900 includes a sub-title 914 indicating that the following instructions are for right-handed users. In other examples, the example introductory page 900 is presented to a user after the user selects the first button 802 of the selection step 800 of FIG. 8. As such, the example introductory page 900 includes a sub-title 914 indicating that the following instructions are for left-handed users. The example sub-title 914 is displayed below the title 129 and an image 182 of the crochet piece. Below the sub-title 914, the example introductory page 900 includes a hyperlink 916 to the crochet pattern corresponding to the crochet piece 102.

Because the example introductory page 900 is displayed after a user selects either the first button 802 or the second button 804 of the selection step 800, the steps included in the tutorial outline 902 correspond to instructions for a left-handed user or a right-handed user. For example, the steps 908 may include a video showing a left-handed user demonstrating the crochet technique corresponding to the step 908. The example steps 908 may include written instruction specific to a left-handed user for the crochet technique corresponding to the step 908. In some examples, the step 908 may be agnostic to the handedness of a user. In these examples, the step 908 for a left-handed user may include the same content (e.g., video and/or written instruction) as the corresponding step 908 for a right-handed user.

Figure 10:
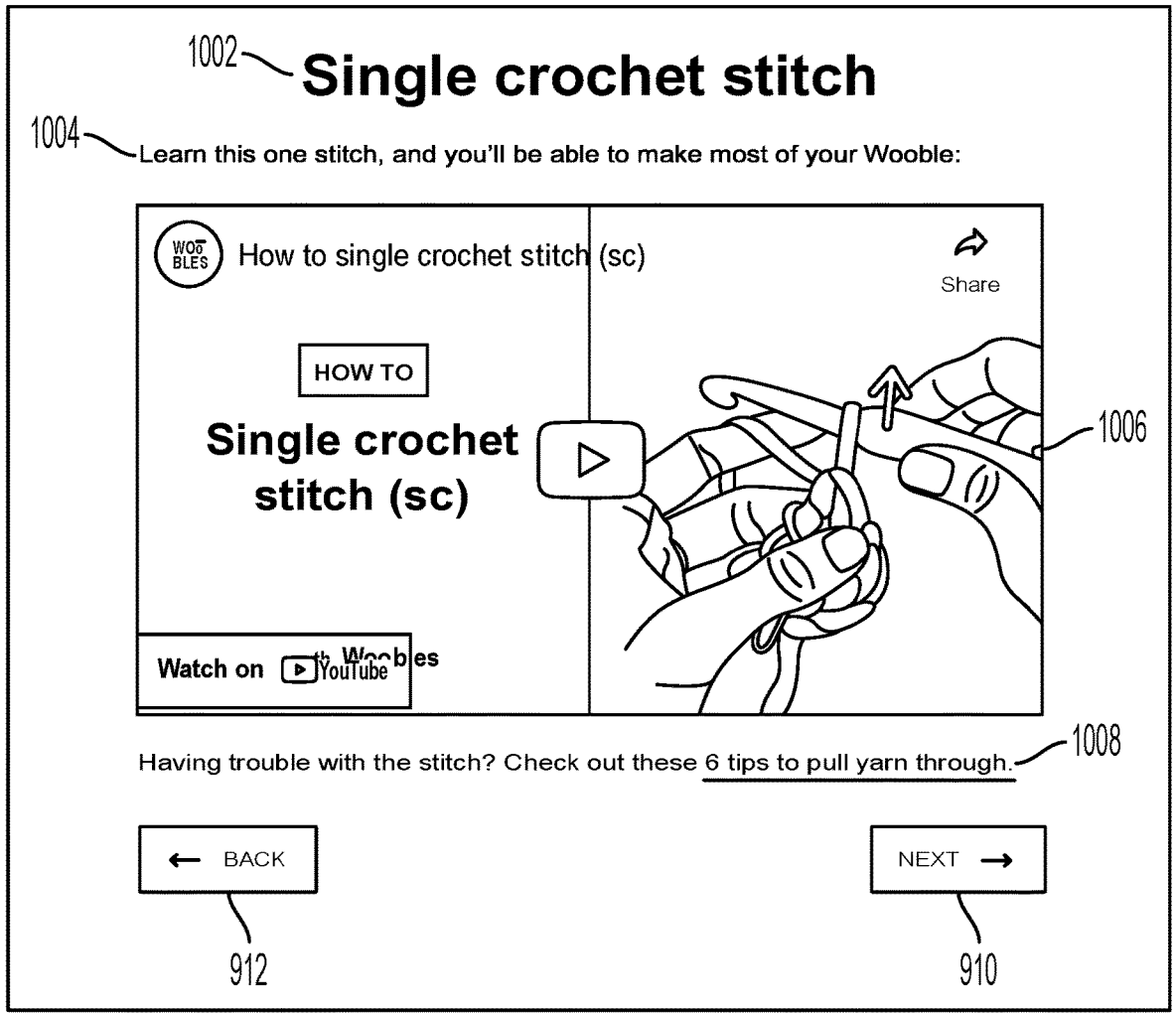
FIG. 10 is a diagram of an example step of the tutorial for completing the crochet piece, according to an example embodiment of the present disclosure.

FIG. 10 is a diagram of an example step 1000 of the tutorial for completing the crochet piece 102, according to an example embodiment of the present disclosure. For example, a user of the user device 602 of FIG. 6 may access the example step 1000 via the server 606 of FIG. 6. The example of FIG. 10 illustrates use of a web browser by the user device 602 to access the step 1000, but it should be appreciated that the step 1000 may be provided in an application of the user device 602.

The example step 1000 displays instructions for a right-handed user to complete the example step 1000. In other embodiments, the example step 1000 displays instructions for a left-handed user to complete the example step 1000. In yet another embodiment, the example step 1000 displays the same content for both a right-handed user or a left-handed user.

The example step 1000 corresponds to a tutorial for a basic crochet technique needed to complete the crochet piece 102. In other embodiments, the example step 1000 may include a tutorial for completing a step specific to the crochet piece 102. The example step 1000 includes a title 1002 of the example step 1000. Displayed below the title 1002 of the example step 1000 is written instructions 1004 for the step 1000. The written instructions 1004 may include introductory or background information about the step 1000, a written description of how to complete the step 1000, and/or any other text designed to improve user experience or assist a user in completing the step 1000.

The example step 1000 includes a video tutorial 1006. The example video tutorial 1006 is displayed below the title 1002 and the written instructions 1004 such that a user can view the title 1002, the written instructions 1004, and the video tutorial 1006 concurrently. In the example step 1000, the video tutorial 1006 includes a human actor performing the step 1000. The example video tutorial 1006 further includes an audio description of the performance of the human actor. The example video tutorial 1006 is short in duration (e.g., 1 minute, 5 minutes, 10 minutes, etc.).

The example written instructions 1004 and the example video tutorial 1006 of the example step 1000 include instructions for a user to complete the step 1000 without prior crochet know-how other than any preceding steps. Further, materials needed to complete the step 1000 are included in the crochet kit 100.

The example step 1000 includes a help content hyperlink 1008. For example, if a user is having difficulty completing the step 1000 with the written instructions 1004 and the video tutorial 1006, the user can select the help content hyperlink 1008 to access additional resources to assist in completing the step 1000. In some examples, the help content hyperlink 1008 allows a user to access an additional video tutorial. In other examples, the help content hyperlink 1008 directs a user to a help content page as discussed below with respect to FIG. 11.

The example step 1000 includes the first navigation button 910 and the second navigation button 912. The example first navigation button 910 may be used to proceed to a subsequent step from the step 1000. The example second navigation button 912 may be used to return to a previous step from the step 1000.

Figure 11:
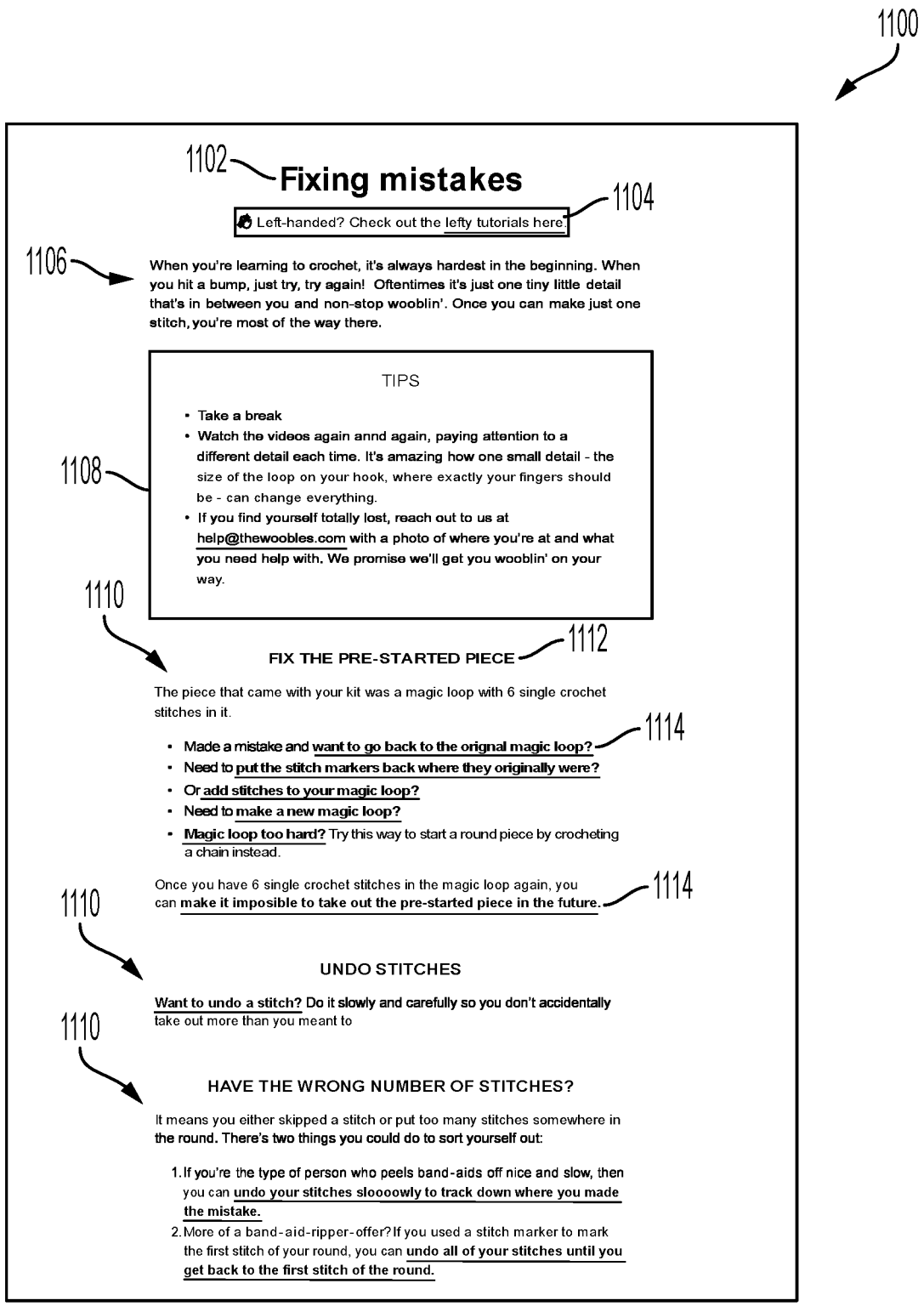
FIG. 11 is a diagram of example help content for completing the crochet piece, according to an example embodiment of the present disclosure.

FIG. 11 is a diagram of a help content page 1100 of the tutorial for completing the crochet piece 102, according to an example embodiment of the present disclosure. For example, a user of the user device 602 of FIG. 6 may access the help content page 1100 via the server 606 of FIG. 6. The example of FIG. 11 illustrates use of a web browser by the user device 602 to access the help content page 1100, but it should be appreciated that the help content page 1100 may be provided in an application of the user device 602. In some examples, the help content page 1100 may be provided in an application of the user device 602 different than an application which provides the steps (e.g., the example step 1000) of the tutorial.

The example help content page 1100 includes supplemental tutorials or links to supplemental tutorials to assist a user in completing the crochet piece 102. The example help content page 1100 includes a title 1102 describing the content included in the help content page 1100. The example help content page 1100 includes tutorials or links to tutorials for right-handed users. In other examples, the help content page 1100 includes tutorials or links to tutorials for left-handed users or includes tutorials suitable for right-handed users or left-handed users. Because the example help content page 1100 includes tutorials or links to tutorials for right-handed users, the example help content page 1100 includes a link 1104 to tutorials for left-handed users.

The example help content page 1100 includes an introduction 1106. The example introduction 1106 may orient a user to the content included in the help content page 1100. Additionally or alternatively, the example introduction 1106 may include words of encouragement for a user. The example help content page 1100 includes a tips section 1108. The example tips section 1108 includes suggestions for a user who has accessed the help content page 1100. The example tips section 1108 of FIG. 11 includes instructions for a user to contact a support person in order to obtain additional help.

The example help content page 1100 includes a plurality of help sections 1110. Each one of the help sections 1110 includes a title of the help section 1112 and one or more help content hyperlinks 1114. The help content hyperlinks 1114 allow a user to access help content corresponding to the help section 1110 that includes the help content hyperlink 1114. In some examples, one or more of the help content hyperlinks 1114 link to a video including a tutorial corresponding to the help content hyperlink 1114. In some examples, one or more of the help content hyperlinks 1114 link to an additional help content page and/or content provided by a third-party.

Figure 12:
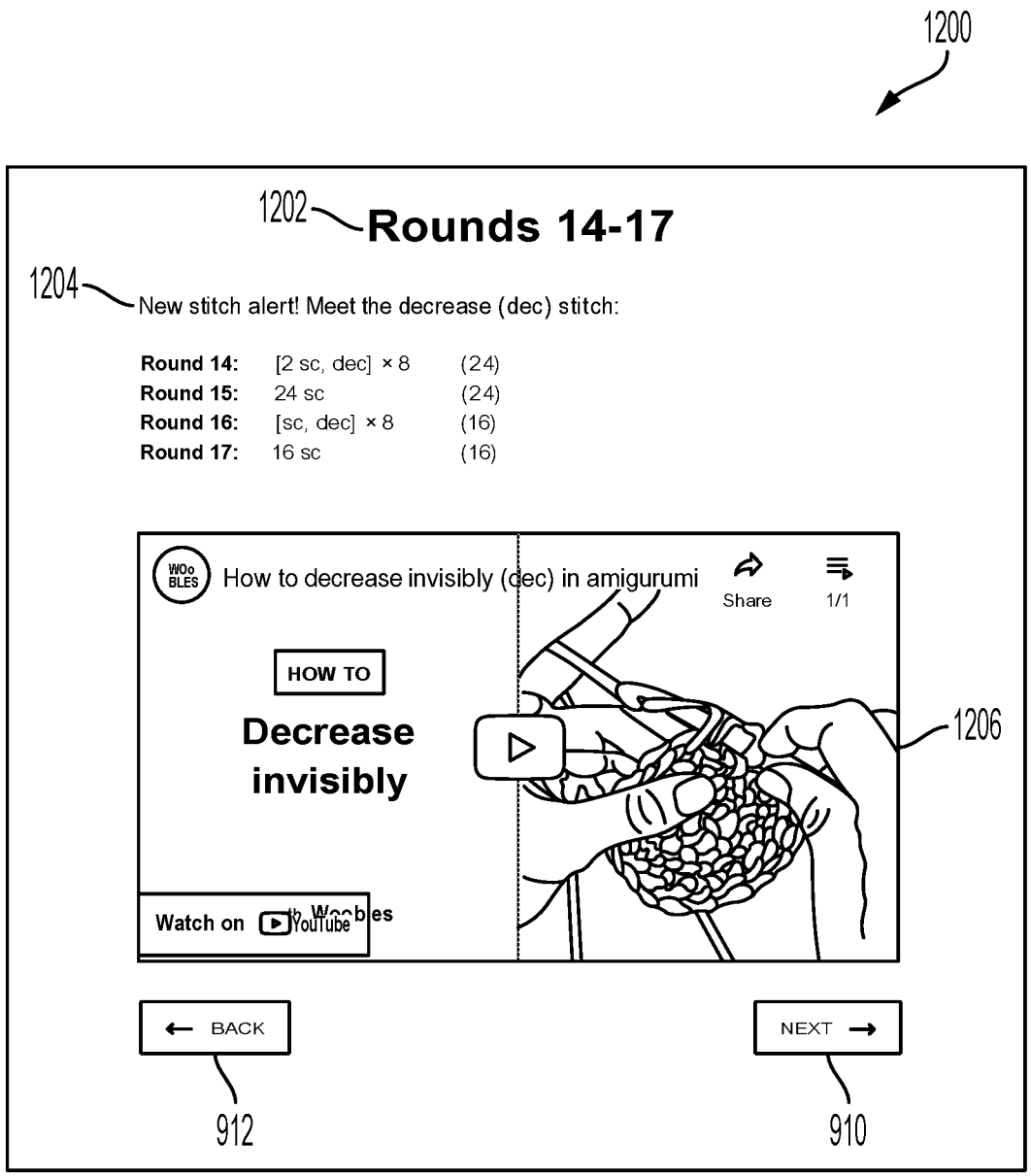
FIG. 12 is a diagram of another example step of the instructions for completing the crochet piece, according to an example embodiment of the present disclosure.

FIG. 12 is a diagram of an example step 1200 of the tutorial for completing the crochet piece 102, according to an example embodiment of the present disclosure. For example, a user of the user device 602 of FIG. 6 may access the example step 1200 via the server 606 of FIG. 6. The example of FIG. 12 illustrates use of a web browser by the user device 602 to access the example step 1200, but it should be appreciated that the example step 1200 may be provided in an application of the user device 602.

The example step 1200 displays instructions for a right-handed user to complete the example step 1200. In other embodiments, the example step 1200 displays instructions for a left-handed user to complete the example step 1200. In yet another embodiment, the example step 1200 displays the same content for both a right-handed user or a left-handed user.

The example step 1200 corresponds to a tutorial for completing a step specific to the crochet piece 102. For example, the step 1200 includes instructions for completing rounds 14-17 of the crochet piece 102. The example step 1200 includes a title 1202 of the example step 1200. Displayed below the title 1202 of the example step 1200 is written instructions 1204 for the step 1200. In the example of FIG. 12, the written instructions 1204 include a portion of the crochet pattern corresponding to the crochet piece 102.

The example step 1200 includes a video tutorial 1206. The example video tutorial 1206 is displayed below the title 1202 and the written instructions 1204 such that a user can view the title 1202, the written instructions 1204, and the video tutorial 1206 concurrently. In the example step 1200, the video tutorial 1206 includes a human actor performing the step 1200. The example video tutorial 1206 further includes an audio description of the performance of the human actor. The example video tutorial 1206 is short in duration (e.g., 1 minute, 5 minutes, 10 minutes, etc.).

The example written instructions 1204 and the example video tutorial 1206 of the example step 1200 include instructions for a user to complete the step 1200 without prior crochet know-how other than any preceding steps. Further, materials needed to complete the step 1200 are included in the crochet kit 100.

The example step 1200 includes the first navigation button 910 and the second navigation button 912. The example first navigation button 910 may be used to proceed to a subsequent step from the step 1200. The example second navigation button 912 may be used to return to a previous step from the step 1200.

Figure 13:
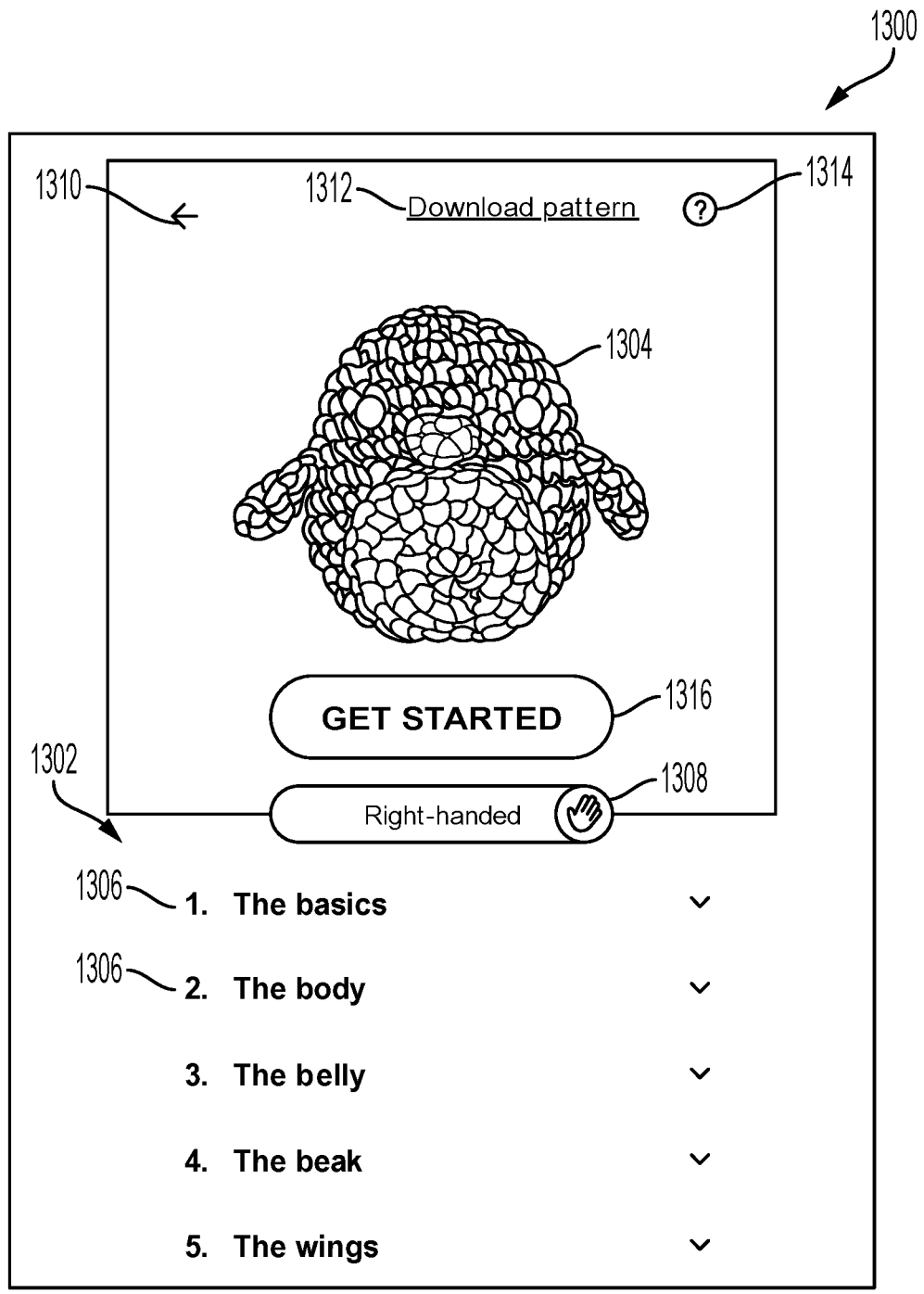
FIG. 13 is a diagram of a second example introductory page of the tutorial which lists additional steps for completing the crochet piece, according to an example embodiment of the present disclosure.

FIG. 13 is a diagram of a second example introductory page 1300 of a tutorial including an outline 1302 of the tutorial for completing a second crochet piece 1304, according to an example embodiment of the present disclosure. For example, a user of the user device 602 of FIG. 6 may access the introductory page 1300 via the server 606 of FIG. 6. The example of FIG. 13 illustrates use of a web browser by the user device 602 to access the example introductory page 1300, but it should be appreciated that the introductory page 1300 may be provided in an application of the user device 602.

The example tutorial outline 1302 includes a plurality of sections 1306. Each one of the sections 1306 may correspond to a different feature of the crochet piece 102. Additionally, each one of the sections 1306 may include one or more steps as illustrated below in conjunction with FIG. 14. As such, the tutorial includes a series of steps organized by different features of the crochet piece 1304.

The example introductory page 1300 includes a handedness indicator 1308. The example handedness indicator 1308 includes text and/or a graphic (e.g., a drawing of a right or left hand) indicating a handedness of the tutorial outline 1302. As such, the handedness indicator 1308 indicates if the tutorial outline 1302 includes instructions for a right-handed user or a left-handed user. In the example of FIG. 13, the handedness indicator 1308 indicates that the tutorial outline 1302 corresponds to instructions for a right-handed user.

In some examples, the handedness indicator 1308 functions as a button for a user to select a handedness of the tutorial. For example, an example user may interact (e.g., click, tap, etc.) with the handedness indicator 1308 to toggle between a tutorial for a right-handed user and a tutorial for a left-handed user.

The example introductory page 1300 includes a navigation button 1310. The example navigation button 1310 allows a user to view a tutorial selection page. For example, the introductory page 1300 includes instructions for a completing the crochet piece 1304. The tutorial selection page (not pictured) may allow a user to select one or more tutorials corresponding to instructions for completing one or more additional crochet pieces.

The example introductory page 1300 includes a pattern hyperlink 1312 for downloading a crochet pattern. For example, a user can click the pattern hyperlink 1312 in order to access a crochet pattern corresponding to the crochet piece 1304. The crochet pattern may include one or more pages, the one or more pages including text and images instructing a user on how to create the crochet piece 1304. In some examples, the crochet pattern is in the form of a Portable Document Format (PDF).

The example introductory page 1300 includes a help content button 1314. For example, a user can select the help content button 1314 to access additional resources to assist in completing the tutorial for completing the crochet piece 1304. In some examples, the help content button 1314 allows a user to access an additional video tutorial. In other examples, the help content button 1314 directs a user to a help content page as discussed below with respect to FIG. 16. In the example of introductory page 1300, the help content button 1314 includes a question mark symbol within a circle. In other examples, the help content button 1314 may include other text, symbols, and/or graphics.

The example introductory page 1300 includes a start button 1316. The example start button 1316 may be used to begin the tutorial. For example, selection of the start button 1316 by a user causes a first step of the tutorial to be displayed. In examples where the handedness indicator 1308 indicates right-handedness, selection of the start button 1316 causes a tutorial to be displayed wherein the subsequent steps include instructions for a right-handed user. In other words, selection of the start button 1316 causes a right-handed project (e.g., the RH project 614 of FIG. 6) to be presented to the user. In examples where the handedness indicator 1308 indicates left-handedness, selection of the start button 1316 causes a tutorial to be displayed wherein the subsequent steps include instructions for a left-handed user. In other words, selection of the start button 1316 causes a left-handed project (e.g., the LH project 612 of FIG. 6) to be presented to the user.

Figure 14:
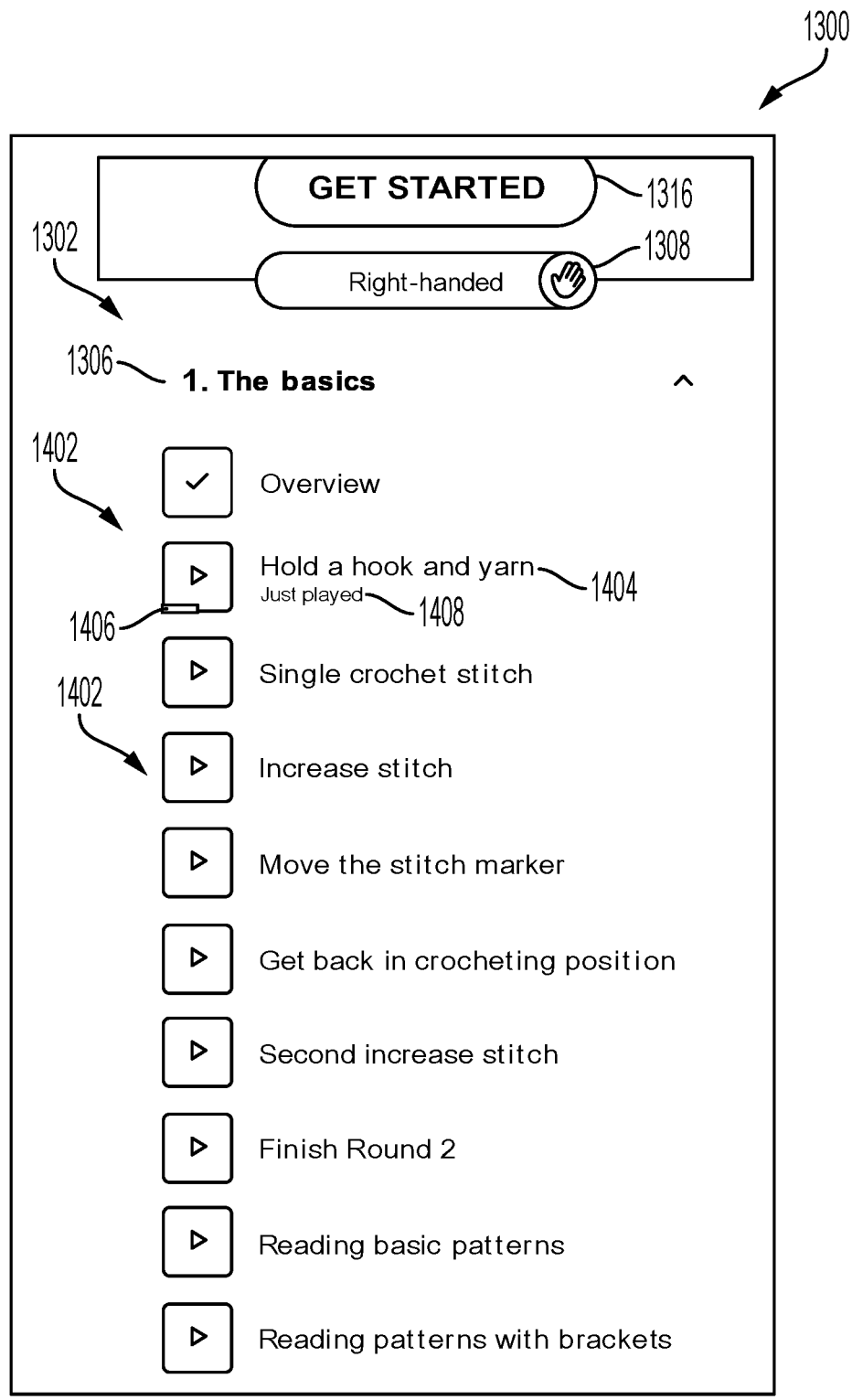
FIG. 14 is another diagram of the second example introductory page of the tutorial which lists additional steps for completing the crochet piece, according to an example embodiment of the present disclosure.

FIG. 14 is another diagram of the second example introductory page 1300 of the tutorial, according to an example embodiment of the present disclosure. As described above, each one of the sections 1306 of the tutorial outline 1302 includes one or more steps 1402. As shown in FIG. 14, a user can select a section 1306 in order to view the one or more steps 1402 included in the section 1306. Each one of the steps 1402 corresponds to a basic crochet technique and/or a specific step for completing the crochet piece 1304.

Each of the steps 1402 includes a title 1404 and a step icon 1406. The example title 1404 of the step 1402 describes the basic crochet technique and/or the specific step for completing the crochet piece 1304 included in the instructions of the step 1402. The example step icon 1406 includes a graphic corresponding to a completion status of the step 1402. The completion status may be collected by the server 606 of FIG. 6 using, for example, browser cookies, session data, local storage, etc. For example, if a user has not yet interacted with the step 1402, the example step icon 1406 may display a play icon (e.g., a right-facing triangle) or any other icon indicating the step 1402 is incomplete (e.g., a dashed circle, etc.). In another example, if a user has completed the step 1402 (e.g., viewed an entirety of the step 1402, viewed more than half of the step 1402, interacted with an end portion of the step 1402, self-certified that the user has completed the step 1402, etc.), the example step icon 1406 may display an icon (e.g., a check mark, a circle, a thumbs-up, etc.) indicating the step 1402 has been completed.

In a third example, if a user has interacted with a portion of the step 1402 but has not completed the step 1402, the example step icon 1406 may indicate a partially complete status of the step 1402. To indicate the partially complete status of the step 1402, the example step icon 1406 may include a play icon including a progress bar. In some examples, the progress bar has a width relative to a width of the status icon corresponding to a percentage of the step 1402 that the user has completed. In other examples, the progress bar has a set width for a partially complete step, the set width not corresponding to a completion percentage of the step 1402.

In some examples, the example step 1402 includes a status indicator 1408. The example status indicator 1408 may display status text near (e.g., below, beside, above, etc.) the title 1404 of the step 1402. The status text may indicate the step 1402 which was most recently viewed by a user.

Each of the example steps 1402 displayed on the introductory page 1300 includes a hyperlink to a page corresponding to the example step 1402. For example, from the introductory page 1300, a user can select any one of the example steps 1402 in order to view the selected step 1402. Each of the example steps 1402 may include one or more videos. Therefore, user selection of one of the steps 1402 via a user device (e.g., the user device 602 of FIG. 6) may cause one or more videos corresponding to the step 1402 to be displayed on the user device.

Figure 15:
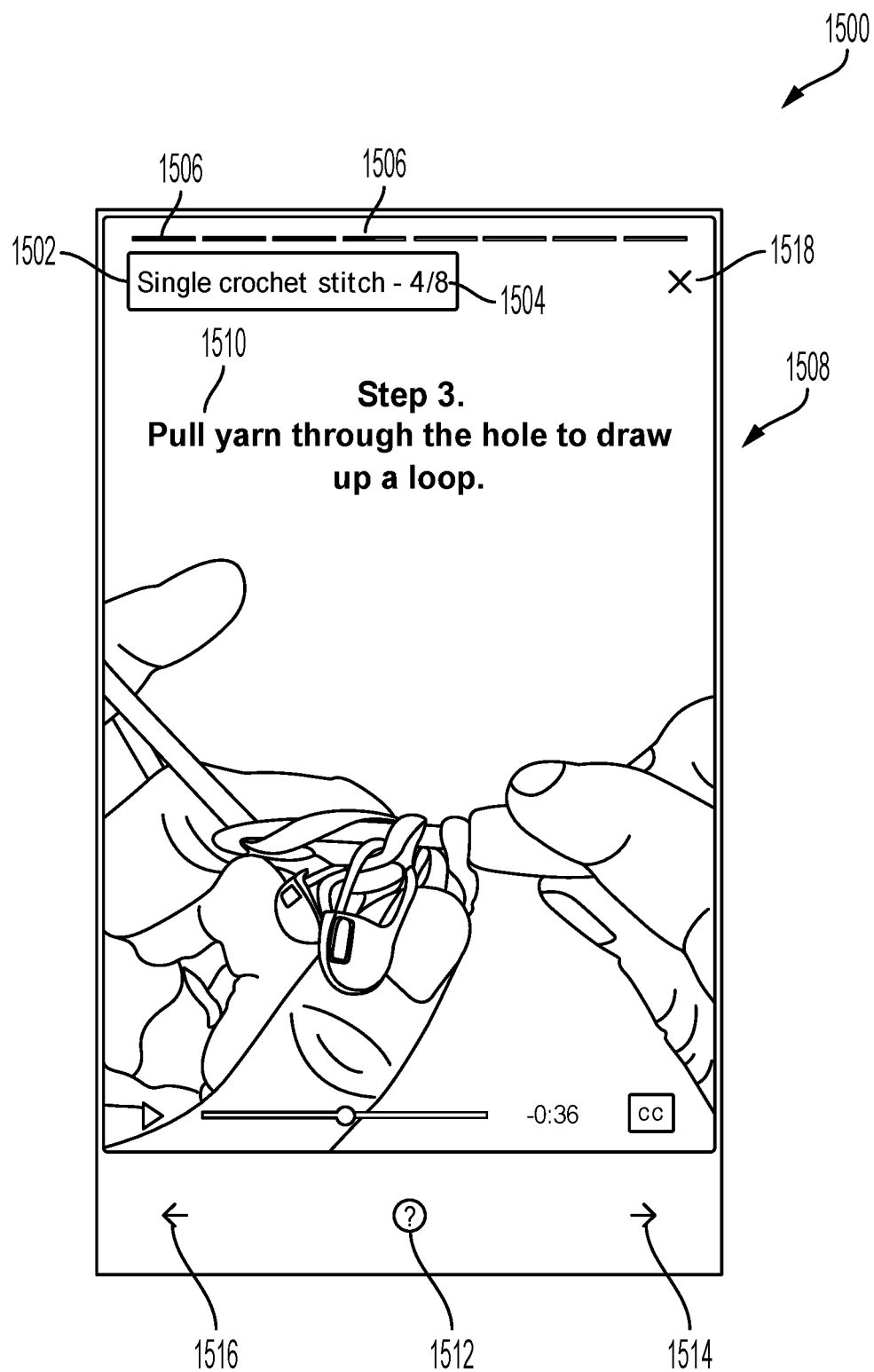
FIG. 15 is a diagram of another example step of the tutorial for completing the crochet piece, according to an example embodiment of the present disclosure.

FIG. 15 is a diagram of an example step 1500 of the tutorial for completing the crochet piece 1304, according to an example embodiment of the present disclosure. For example, a user of the user device 602 of FIG. 6 may access the example step 1500 via the server 606 of FIG. 6. The example of FIG. 15 illustrates use of a web browser by the user device 602 to access the step 1500, but it should be appreciated that the step 1500 may be provided in an application of the user device 602.

The example step 1500 displays instructions for a right-handed user to complete the example step 1500. In other embodiments, the example step 1500 displays instructions for a left-handed user to complete the example step 1500. In yet another embodiment, the example step 1500 displays the same content for both a right-handed user or a left-handed user. The example step 1500 includes one or more microsteps. For example, a microstep may include a short tutorial for completing a portion of the step 1500. The short tutorials included in the one or more microsteps of the example step 1500 make up the tutorial of the step 1500. The example microsteps may improve a user experience of interacting with the example step 1500. For example, the microsteps allow a user to easily navigate through the tutorial of the step 1500 to locate relevant content, easily re-watch a microstep, or easily skip over microsteps.

The example step 1500 corresponds to a tutorial for a basic crochet technique needed to complete the crochet piece 1304. In other embodiments, the example step 1500 may include a tutorial for completing a step specific to the crochet piece 1304. The example step 1500 includes a title 1502 of the example step 1500. The example step title 1502 includes a microstep indicator 1504. The example microstep indicator 1504 indicates a microstep that is being displayed. For example, the step 1500 includes eight microsteps and a fourth of the eight microsteps is currently displayed.

The example microsteps are indicated on the example step 1500 by progress bars 1506 corresponding to each of the microsteps. For example, the example step 1500 includes eight microsteps. The example step 1500 displays eight progress bars 1506, each one corresponding to one of the microsteps. The progress bars 1506 can indicate a status of each one of the microsteps. For example, if a microstep has been completed by a user (e.g., viewed an entirety of the microstep, viewed more than half of the microstep, interacted with an end portion of the microstep, self-certified that the user has completed the microstep, etc.), the progress bar 1506 may be represented by a color (e.g., white) corresponding to a completed microstep. In another example, if a microstep has not yet interacted with the microstep, the example progress bar 1506 may display a transparent, shaded, gray, or any other color bar indicating the microstep is incomplete.

In a third example, if a user has interacted with a portion of the microstep but has not completed the microstep, the example progress bar may indicate a partially complete status of the microstep. To indicate the partially complete status of the microstep, a portion of the example progress bar 1506 may be colored as a completed microstep. The portion of the example progress bar 1506 colored as a completed microstep may correspond to a percentage of the microstep that the user has completed (e.g., viewed). In other examples, the progress bar has a set width for a partially complete step, the set width not corresponding to a completion percentage of the microstep.

The example step 1500 includes a microstep video 1508. The example microstep video 1508 includes a tutorial for completing the microstep. In the example step 1500, the microstep video 1508 includes a human actor performing the microstep. In other examples, the microstep video may include still images, drawings, animated drawings, or a series of text. The example microstep video 1508 further includes an audio description of the performance of the human actor. The example microstep video 1508 is short in duration (e.g., 1 minute, 5 minutes, 10 minutes, etc.).

In the example of FIG. 15, the microstep video 1508 includes written instructions 1510. The written instructions 1510 may include introductory or background information about the step 1500, a written description of how to complete the step 1500, and/or any other text designed to improve user experience or assist a user in completing the step 1500. The example written description 1510 and the example microstep video 1508 include instructions for a user to complete the displayed microstep of the step 1500 without prior crochet know-how other than any preceding steps and/or microsteps. Further, materials needed to complete the step 1500 are included in the crochet kit 100.

The example step 1500 includes a help content button 1512. For example, a user can select the help content button 1512 to access additional resources to assist in completing the displayed microstep and/or the step 1500. In some examples, the help content button 1512 allows a user to access an additional video tutorial. In other examples, the help content button 1512 directs a user to a help content page as discussed below with respect to FIG. 16. In the example of step 1500, the help content button 1512 includes a question mark symbol within a circle. In other examples, the help content button 1512 may include other text, symbols, and/or graphics.

The example step 1500 includes a first navigation button 1514 and a second navigation button 1516. The example first navigation button 1514 may be used to proceed to a subsequent microstep within the step 1500 or a subsequent step from the step 1500. The example second navigation button 1516 may be used to return to a previous microstep within the step 1500 or a previous step from the step 1500. The example step 1500 also includes an exit button 1518. The example exit button 1518 may be used to return to the introductory page 1300. For example, a user can select the exit button 1518 to return to the introductory page 1300 from the example step 1500.

User interaction with the step 1500 and/or the microsteps of the step 1500 may be collected by a server (e.g., the server 606 of FIG. 6) as interaction data (e.g., the interaction data 618 of FIG. 6). For example, the server 606 may record a number of times users interact with the step 1500. Interaction with the step 1500 includes selection of the help content button 1512, viewing the microstep video 1508, repeated viewing the microstep video 1508, and/or interaction with the first navigation button 1514 and/or the second navigation button 1516. In some examples, the interaction data 618 corresponds to the step 1500. In some examples, the interaction data 618 corresponds to a microstep of the step 1500.

Figure 16:
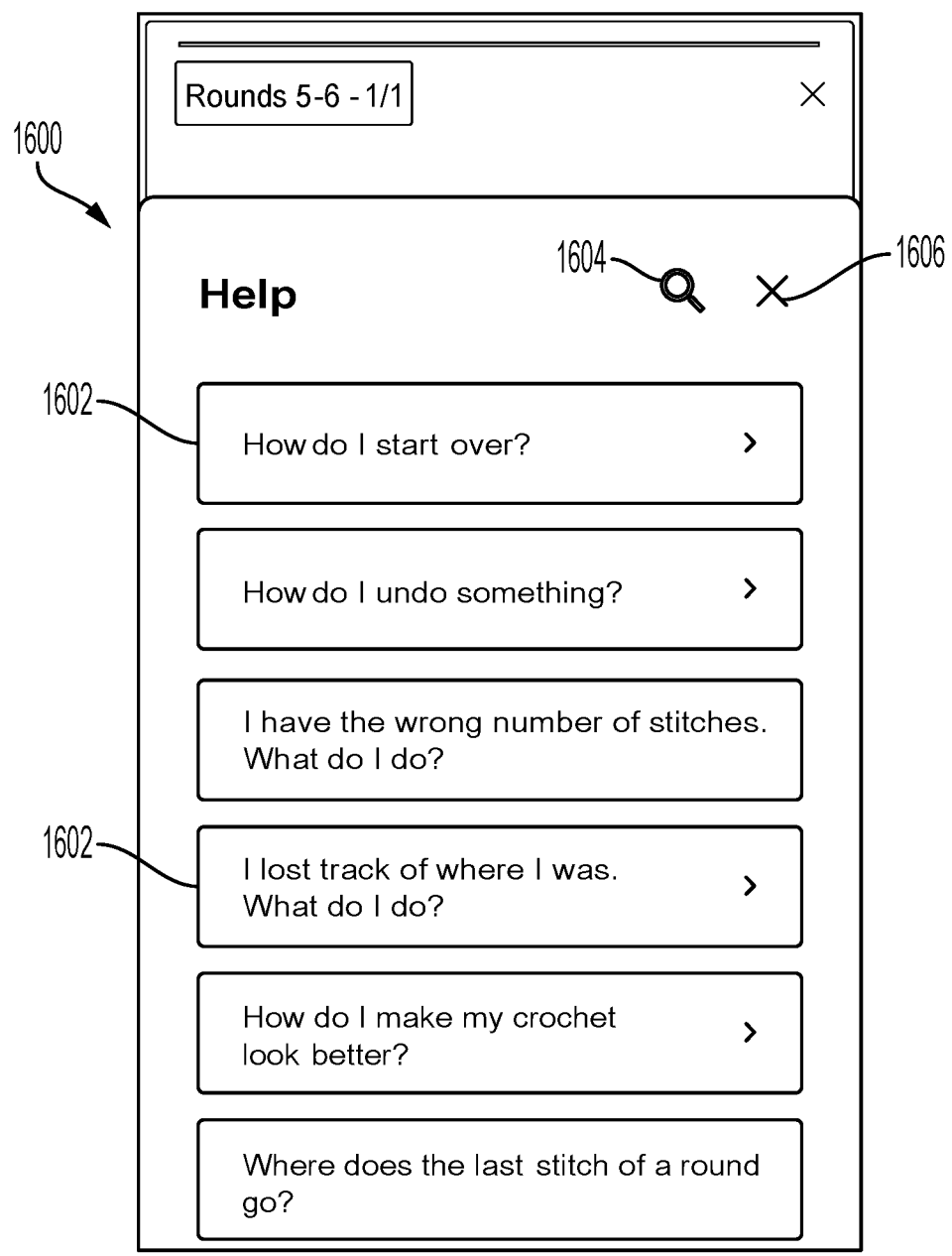
FIG. 16 is a diagram of second example help content for completing the crochet piece, according to an example embodiment of the present disclosure.

FIG. 16 is a diagram of a second example help content page 1600 for completing the crochet piece 1304, according to an example embodiment of the present disclosure. For example, a user of the user device 602 of FIG. 6 may access the help content page 1600 via the server 606 of FIG. 6. The example of FIG. 16 illustrates use of a web browser by the user device 602 to access the help content page 1600, but it should be appreciated that the help content page 1600 may be provided in an application of the user device 602.

The example help content page 1600 may be displayed on the user device 602 when a user selects a help content button (e.g., the help content button 1512). In the example of FIG. 16, the help content page 1600 is displayed on top of a page for a step such that a portion of the page for the step is visible. In other examples, the help content page 1600 may be displayed such that only the help content page 1600 is visible.

The example help content page 1600 includes one or more help content prompts 1602. The example help content prompts 1602 include questions corresponding to common issues a user may have when completing the tutorial. In some examples, the help content prompts 1602 correspond to common issues a user may have when performing a step of the tutorial that included the help content button from which the user accessed the help content page 1600. Each of the one or more help content prompts 1602 includes a hyperlink such that selection of a help content prompt 1602 allows a user to view a follow-up help content page or help content (e.g., a video, a written description, etc.) associated with the help content prompt 1602.

The example help content page 1600 includes a search button 1604. For example, a user can select the search button 1604 in order to view a search bar (not shown). The user can enter one or more search terms in the search bar in order to search for help content related to the one or more search terms. The example help content page 1600 also includes an exit button 1606. The example exit button 1606 may be used to return to the page for the step from which the user accessed the help content page 1600. In other examples, the exit button 1606 can be used to return to the introductory page 1300 or any other page of the tutorial.

Figure 17:
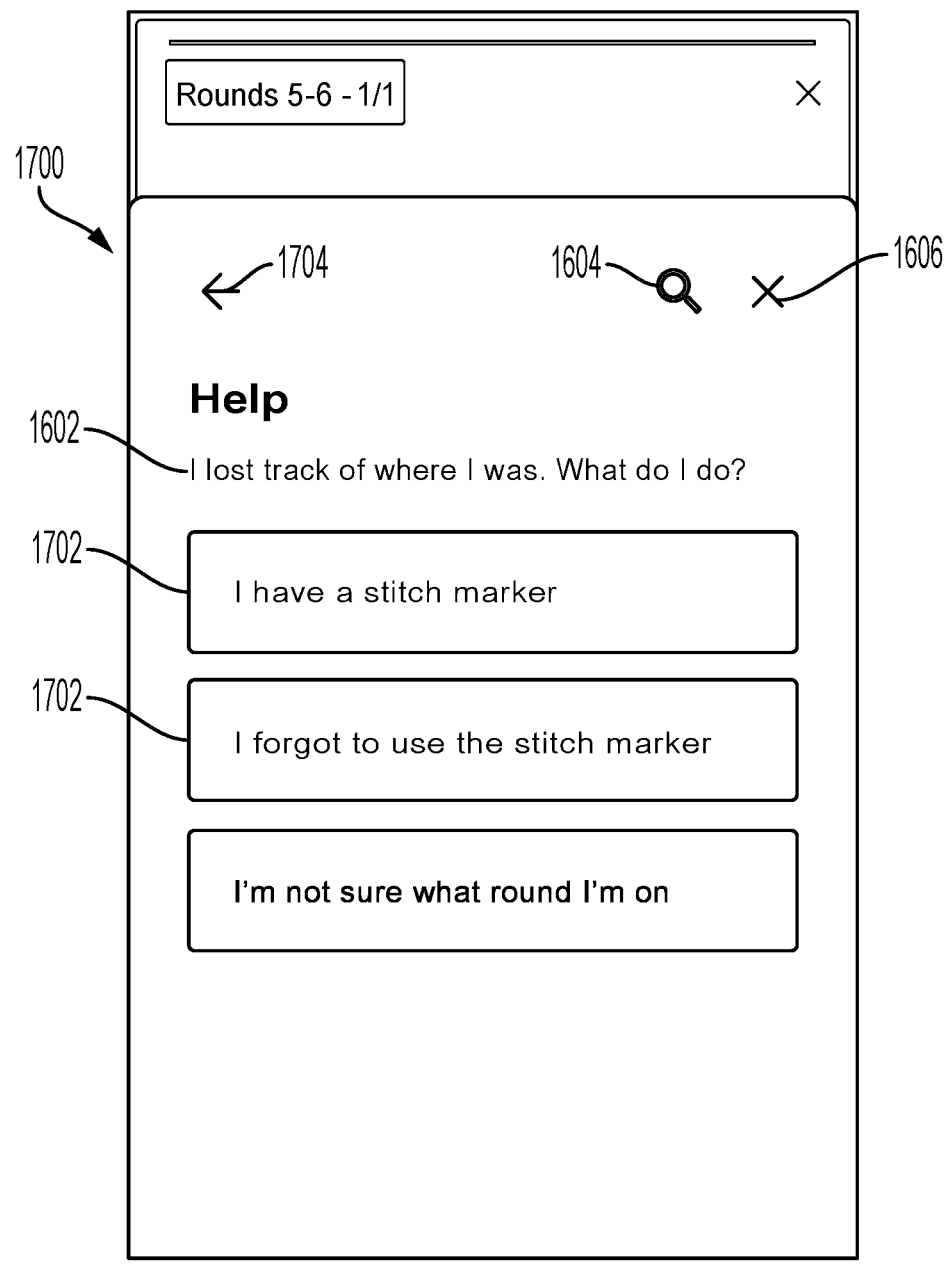
FIG. 17 is another diagram of second example help content for completing the crochet piece, according to an example embodiment of the present disclosure.

FIG. 17 is a diagram of a help content follow-up page 1700 for completing the crochet piece 1304, according to an example embodiment of the present disclosure. For example, a user of the user device 602 of FIG. 6 may access the help content follow-up page 1700 via the server 606 of FIG. 6. The example of FIG. 17 illustrates use of a web browser by the user device 602 to access the help content follow-up page 1700, but it should be appreciated that the help content follow-up page 1700 may be provided in an application of the user device 602.

The example help content follow-up page 1700 may be displayed on the user device 602 when a user selects one of the help content prompts 1602 of the help content page 1600 of FIG. 16. As such, the help content follow-up page 1700 displays the selected help content prompt 1602. Displayed below the help content prompt 1602 are one or more follow-up prompts 1702. The example follow-up prompts 1702 include one or more common responses to the help content prompt 1602 displayed on the help content follow-up page 1700. Each one of the one or more follow-up prompts 1702 includes a hyperlink such that selection of a follow-up prompt 1702 allows a user to view a second follow-up help content page or help content (e.g., a video, a written description, etc.) associated with the follow-up prompt 1702.

The example help content follow-up page 1700 includes the search button 1604 and the exit button 1606. The example help content follow-up page 1700 also includes a return button 1704. For example, a user can select the return button 1704 to return to the help content page 1600 from the help content follow-up page 1700.

Figure 18:
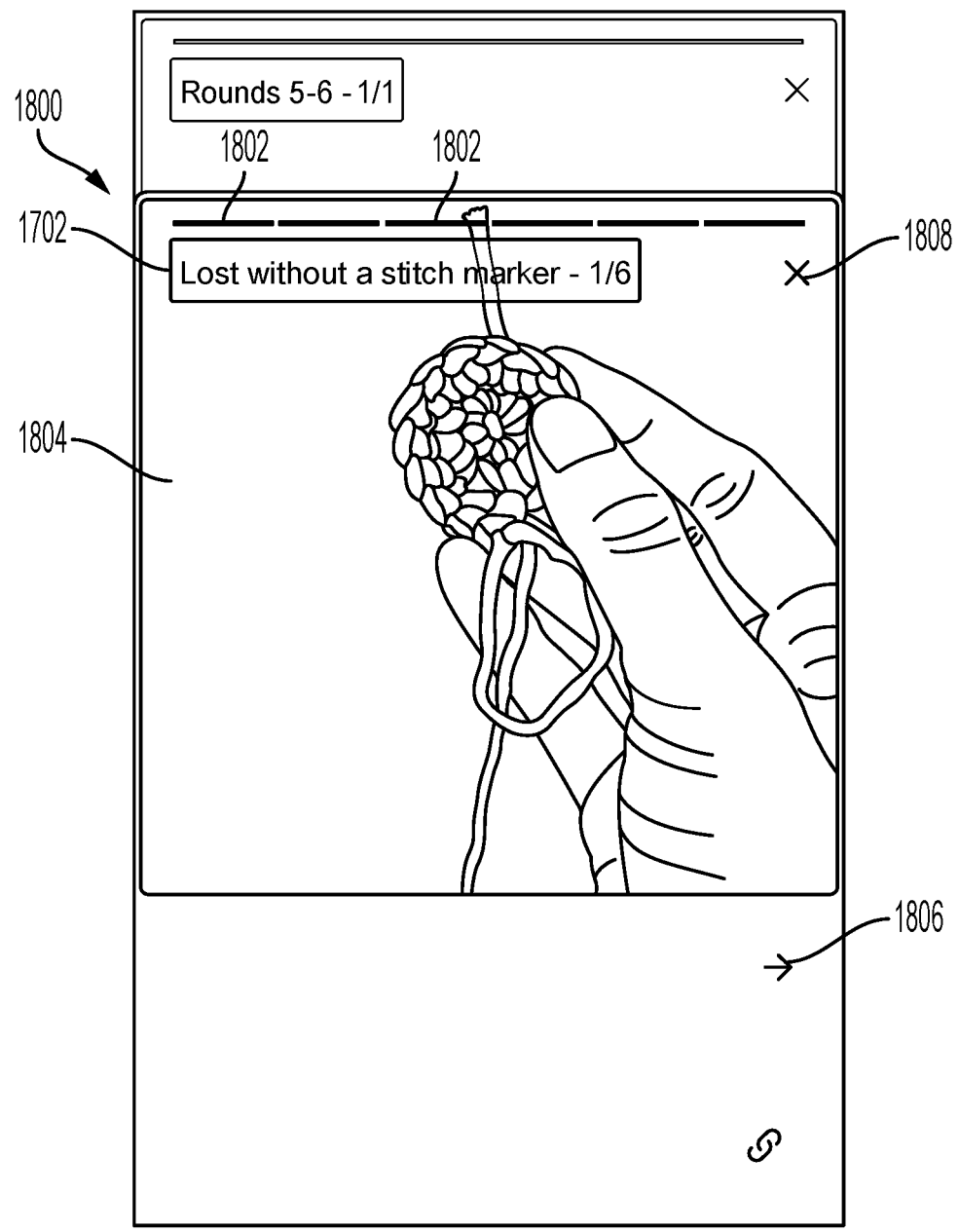
FIG. 18 is a diagram of a help content video page for completing the crochet piece, according to an example embodiment of the present disclosure.

FIG. 18 is a diagram of a help content video page 1800 for completing the crochet piece 1304, according to an example embodiment of the present disclosure. For example, a user of the user device 602 of FIG. 6 may access the help content video page 1800 via the server 606 of FIG. 6. The example of FIG. 18 illustrates use of a web browser by the user device 602 to access the help content video page 1800, but it should be appreciated that the help content video page 1800 may be provided in an application of the user device 602.

The example help content video page 1800 may be displayed on the user device 602 when a user selects one of the help content prompts 1602 of the help content page 1600 of FIG. 16 or one of the follow-up prompts 1702 of the help content follow-up page 1700 of FIG. 17. In the example of the FIG. 18, the help content video page 1800 is displayed after selection of a follow-up prompt 1702. As such, the help content video page 1800 displays the selected follow-up prompt 1702.

The example help content video page 1800 displays a help tutorial for assisting a user in response to the follow-up prompt 1702. The example help content video page 1800 includes one or more help microsteps for completing the help tutorial. The example help content video page 1800 includes one or more progress bars 1802 corresponding to the one or more help microsteps. The one or more progress bars 1802 may indicate a completion status of each one of the help microsteps, as described above with respect to the progress bars 1506 of FIG. 15.

The example help content video page 1800 includes a help microstep video 1804. The example help microstep video 1804 includes a tutorial for completing the help microstep. The example help microstep video 1804 includes a human actor performing the help microstep. In other examples, the help microstep video may include still images, drawings, animated drawings, or a series of text. The example help microstep video 1804 further includes an audio description of the performance of the human actor. The example help microstep video 1804 is short in duration (e.g., 1 minute, 5 minutes, 10 minutes, etc.).

The example help content video page 1800 includes a navigation button 1806. The example navigation button 1806 may be used to proceed to a subsequent help microstep within the help content video page 1800. In some examples, the help content video page 1800 includes a second navigation button (not pictured) that may be used to return to a previous help microstep within the help content video page 1800. The example help content video page 1800 also includes an exit button 1808. The example exit button 1808 may be used to return to a step (e.g., the step 1500). For example, a user can select the exit button 1810 to close the displayed help content.

Figure 19:
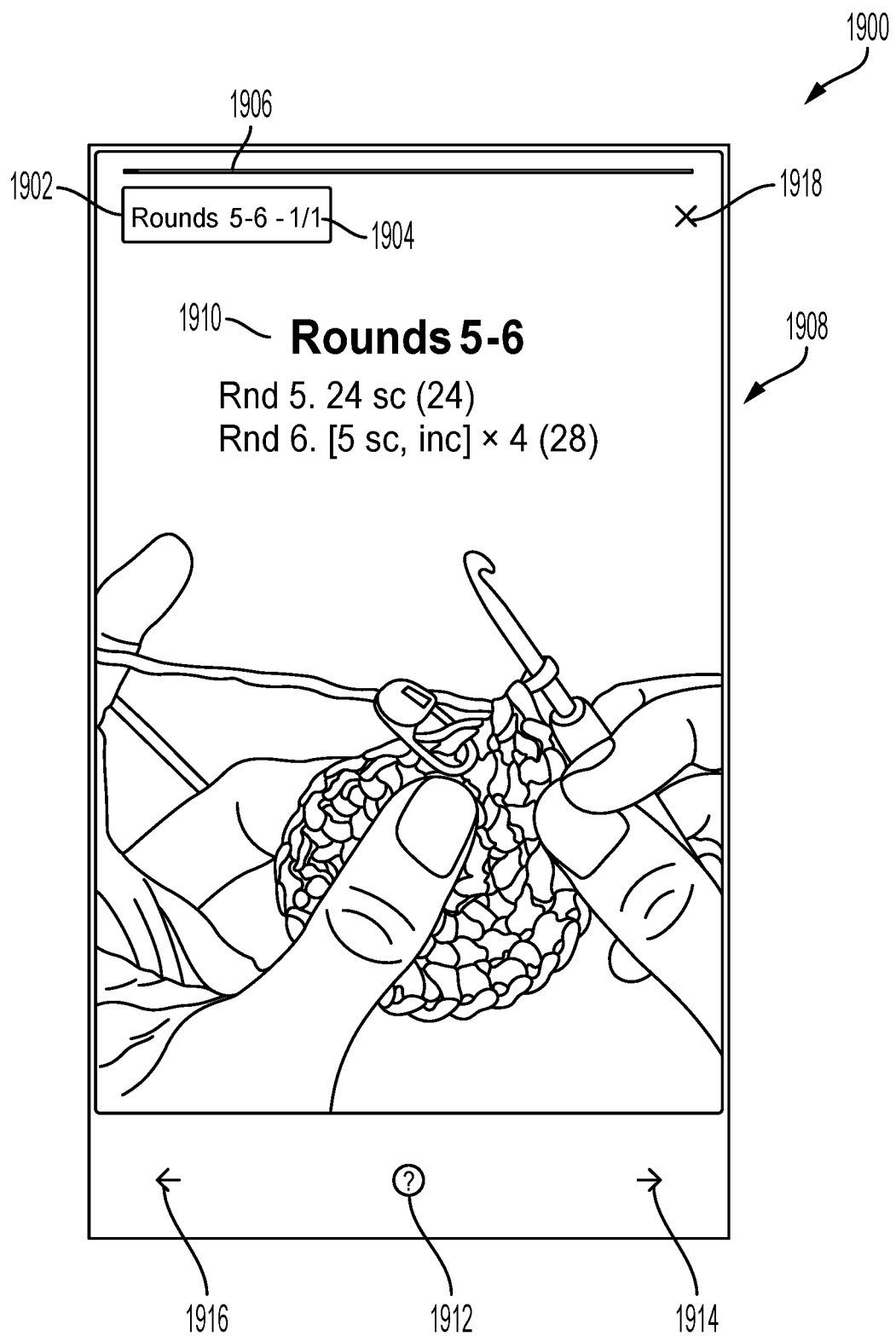
FIG. 19 is a diagram of another example step of the instructions for completing the crochet piece, according to an example embodiment of the present disclosure.

FIG. 19 is a diagram of another example step 1900 of the instructions for completing the crochet piece 1304, according to an example embodiment of the present disclosure. For example, a user of the user device 602 of FIG. 6 may access the example step 1900 via the server 606 of FIG. 6. The example of FIG. 19 illustrates use of a web browser by the user device 602 to access the step 1900, but it should be appreciated that the step 1900 may be provided in an application of the user device 602.

The example step 1900 displays instructions for a right-handed user to complete the example step 1500. In other embodiments, the example step 1900 displays instructions for a left-handed user to complete the example step 1900. In yet another embodiment, the example step 1900 displays the same content for both a right-handed user or a left-handed user. The example step 1900 includes one microstep. For example, a title 1902 of the step 1900 includes a microstep indicator 1904. The example microstep indicator 1904 indicates that a first of one microsteps of the example step 1900 is displayed.

The example microsteps is indicated on the example step 1900 by a progress bar 1906 corresponding to the microstep. The example progress bar 1906 may indicate a completion status of the microstep, as described above with respect to the progress bars 1506 of FIG. 15. The example step 1900 includes a microstep video 1908. The example microstep video 1908 includes a tutorial for completing the microstep. In the example step 1900, the microstep video 1908 includes a human actor performing the microstep. In other examples, the microstep video 1908 may include still images, drawings, animated drawings, or a series of text. The example microstep video 1908 further includes an audio description of the performance of the human actor. The example microstep video 1908 is short in duration (e.g., 1 minute, 5 minutes, 10 minutes, etc.).

In the example of FIG. 19, the microstep video 1908 includes written instructions 1910. The written instructions 1910 may include introductory or background information about the step 1900, a written description of how to complete the step 1900, a portion of a crochet pattern for completing the microstep, and/or any other text designed to improve user experience or assist a user in completing the step 1900. The example written description 1910 and the example microstep video 1908 include instructions for a user to complete the displayed microstep of the step 1900 without prior crochet know-how other than any preceding steps and/or microsteps. Further, materials needed to complete the step 1900 are included in a crochet kit (e.g., the crochet kit 100) corresponding to the crochet piece 1304.

The example step 1900 includes a help content button 1912 for accessing a help content page (e.g., the help content page 1600 of FIG. 16). The example step 1900 includes a first navigation button 1914 and a second navigation button 1916. The example first navigation button 1914 may be used to proceed to a subsequent step from the step 1900. The example second navigation button 1916 may be used to return to a previous step from the step 1900. The example step 1900 also includes an exit button 1918. The example exit button 1918 may be used to return to the introductory page 1300.

Figure 20:
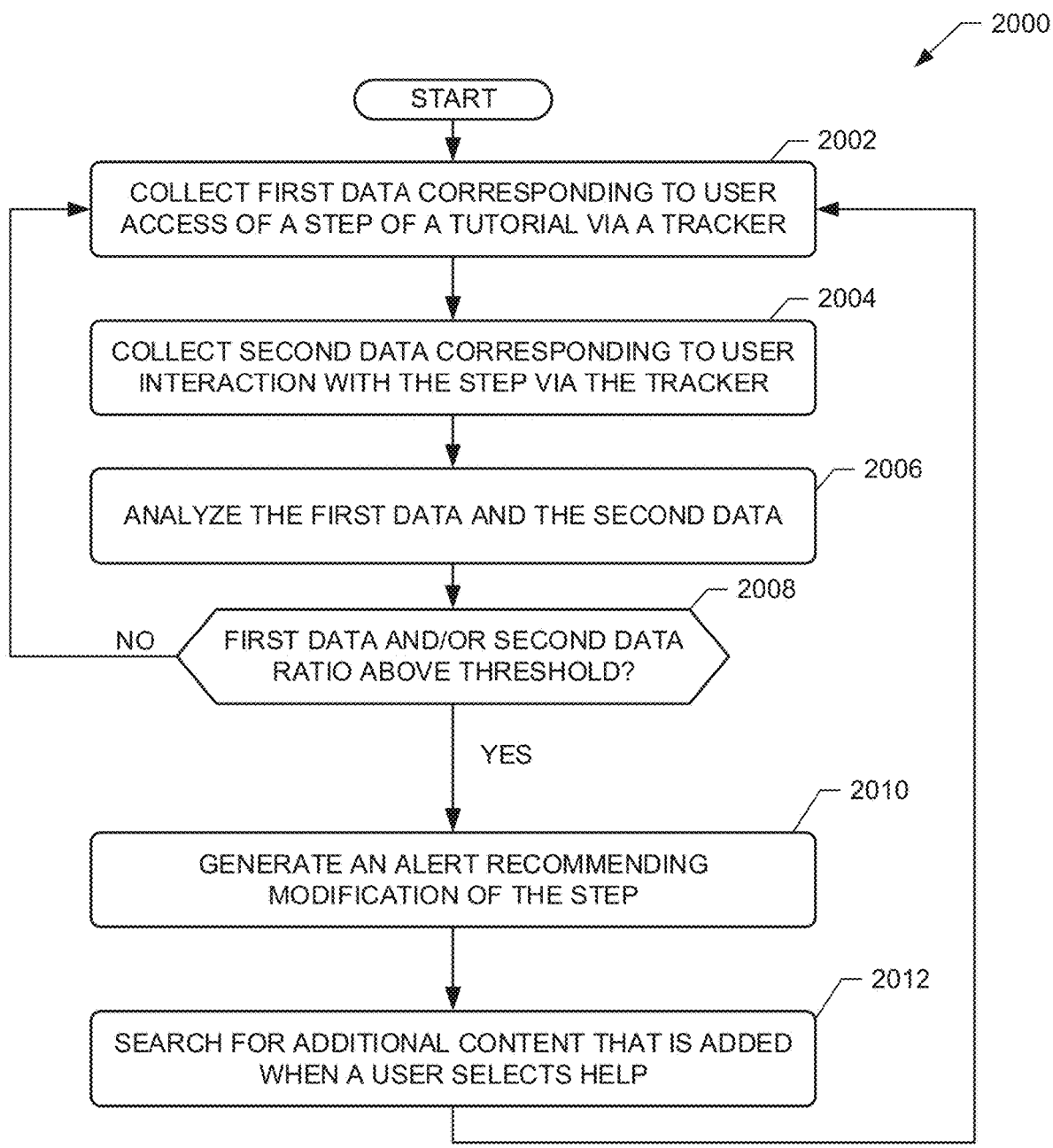
FIG. 20 shows a flow diagram illustrating an example procedure for identifying less optimal steps of the instructions, according to an example embodiment of the present disclosure.

FIG. 20 shows a flow diagram illustrating an example procedure for identifying less optimal steps of the tutorial, according to an example embodiment of the present disclosure. The example procedure 2000 may be carried out by, for example, the server 606 and/or a processor of the device 620 described in conjunction with FIG. 6. Although the procedure 2000 is described with reference to the flow diagram illustrated in FIG. 20, it should be appreciated that many other methods of performing the functions associated with the procedure 2000 may be used. For example, the order of many of the blocks may be changed, certain blocks may be combined with other blocks, and many of the blocks described are optional.

The example procedure 2000 begins at block 2002 when the tracker 710 collects first data corresponding to user access (e.g., the access data 616 of FIG. 6) for a given step of a tutorial to complete a crochet piece. For example, the tracker 710 may monitor a number of times users access the step. At block 2004, the example tracker 710 collects second data corresponding to user interaction (e.g., the interaction data 618) with the step of the tutorial to complete the crochet piece. For example, the tracker 710 may monitor a number of times users view a video displayed on the step. Additionally or alternatively, the example tracker 710 may monitor a length of time a user access the step. Further, the example tracker 710 may monitor a number of times users access help content associated with the step. The example tracker 710 may use any one or any combination of the above-listed data as the second data corresponding to user interaction with the step.

At block 2006, the example tracker 710 analyzes the first data and/or the second data to check if the data indicates that the step may be optimized for better user experience. For example, the example tracker 710 may compare a value of the second data with a value of the first data to determine a ratio of the second data to the first data.

At block 2008, the example tracker 710 checks if the ratio of the second data to the first data is above a threshold. In other embodiments, the example tracker 710 at block 2008 can check if the value of the first data is above a second threshold. In yet another embodiment, the example tracker 710 can check if the value of the second data is above a third threshold.

If none of the ratio, the first data, or the second data are above the first, second or third thresholds, the example procedure 2000 of FIG. 20 returns to block 2002. If one or more of the ratio, the first data, or the second data are above the first threshold, the second threshold, or the third threshold, the process of FIG. 20 continues to block 2010. At block 2010, the example tracker 710 generates an alert recommending modification of the step. At step 2012, the example tracker 710 searches for additional content to add to the help content associated with the step. Subsequently, the procedure 2000 of FIG. 20 returns to block 2002 to continue collecting the first data.

CONCLUSION

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It should be appreciated that 35 U.S.C. 112(f) or pre-AIA 35 U.S.C 112, paragraph 6 is not intended to be invoked unless the terms "means" or "step" are explicitly recited in the claims. Accordingly, the claims are not meant to be limited to the corresponding structure, material, or actions described in the specification or equivalents thereof The invention is claimed as follows:

1. A kit for making a crochet piece, the kit including:
   a length of yarn, a first end of the yarn formed into a pre-started piece, the pre-started piece including a plurality of crochet stitches, at least one stitch marker in at least one of the crochet stitches, and a knot to prevent unraveling of the pre-started piece; and
   an article including (i) a link to an electronic address with instructions for forming the crochet piece using the length of yarn and the pre-started piece, and (ii) a code for accessing the instructions.

2. The kit of claim 1, wherein the yarn is a tubular yarn.

3. The kit of claim 1, wherein the pre-started piece is formed using a magic loop crochet technique.

4. The kit of claim 1, wherein the instructions include a series of videos.

5. The kit of claim 1, wherein the instructions include a series of steps, selection of each step via a user device causing a video to be displayed in the user device for the selected step.

6. The kit of claim 5, wherein each of the videos includes an audio-visual tutorial for completing the selected step of the crochet piece.

7. The kit of claim 5, wherein the series of steps are organized by different features of the crochet piece.

8. The kit of claim 5, wherein each step of the series of steps is linked to a previous step and a subsequent step.

9. The kit of claim 5, wherein each step of the series of steps is linked to a help section with additional information about the step.

10. The kit of claim 1, further comprising a hook, a tapestry needle, one or more facial hardware components, and stuffing.

11. The kit of claim 1, wherein the pre-started piece includes two or more stitch markers.

12. The kit of claim 1, wherein the instructions include a first option for a left-handed user and a second option for a right-handed user, selection of the first option via a user device causing first instructions for a left-handed user to be displayed via the user device, and selection of the second option via the user device causing second instructions for a right-handed user to be displayed via the user device.

* * * * *